US011249373B2

(12) United States Patent
Martí I Renom

(10) Patent No.: US 11,249,373 B2
(45) Date of Patent: Feb. 15, 2022

(54) FITTING ROOM COMPRISING A PORTRAIT PHOTOGRAPHIC SYSTEM, AND A COMPUTER PROGRAM

(71) Applicant: APPLIKAM DEVICES SL, Barcelona (ES)

(72) Inventor: Francesc Xavier Martí I Renom, Sant Quintí de Mediona (ES)

(73) Assignee: APPLIKAM DEVICES SL, Barcelona (ES)

( * ) Notice: Subject to any disclaimer, the term of this patent is extended or adjusted under 35 U.S.C. 154(b) by 183 days.

(21) Appl. No.: 16/091,623

(22) PCT Filed: Apr. 5, 2017

(86) PCT No.: PCT/EP2017/058151
§ 371 (c)(1),
(2) Date: Oct. 5, 2018

(87) PCT Pub. No.: WO2017/174677
PCT Pub. Date: Oct. 12, 2017

(65) Prior Publication Data
US 2019/0121221 A1    Apr. 25, 2019

(30) Foreign Application Priority Data

Apr. 6, 2016  (EP) .................................... 16382151

(51) Int. Cl.
*H04N 7/18* (2006.01)
*G03B 17/56* (2021.01)
(Continued)

(52) U.S. Cl.
CPC .......... *G03B 17/561* (2013.01); *G03B 15/00* (2013.01); *G03B 17/48* (2013.01); *G03B 17/565* (2013.01);
(Continued)

(58) Field of Classification Search
CPC ...... G03B 15/00; G03B 17/48; G03B 17/561; G03B 17/565
(Continued)

(56) References Cited

U.S. PATENT DOCUMENTS 9,170,473 B1    10/2015 Li
9,243,741 B1    1/2016 Chu
(Continued)

FOREIGN PATENT DOCUMENTS

EP    2 184 632    5/2010
JP    2002 208067    7/2002
(Continued)

*Primary Examiner* — Trang U Tran
(74) *Attorney, Agent, or Firm* — Ice Miller LLP

(57) ABSTRACT

The fitting room comprises a portrait photographic system which comprises: —a mirror; —a support physically attached to the mirror, or to a structural member fixed thereto, the support being configured and arranged to interchangeably and removably attach thereto any of a plurality of portable computing devices having built-in cameras; and—a local computing entity adapted to establish a communication link with the portable computing device attached or to be attached to the support, in order to acquire one or more images of a user placed in front of the mirror with the built-in camera of the portable computing device once attached to the support. The computer program comprises computer subprograms adapted to operate the system of the fitting room of the invention.

21 Claims, 15 Drawing Sheets

(51) Int. Cl.
  *G03B 15/00*    (2021.01)
  *G03B 17/48*    (2021.01)
  *H04N 5/232*    (2006.01)
  *G06K 7/10*     (2006.01)
  *H04L 29/08*    (2006.01)

(52) U.S. Cl.
  CPC ....... *G03B 17/566* (2013.01); *G06K 7/10297* (2013.01); *H04L 67/141* (2013.01); *H04N 5/23206* (2013.01); *H04N 5/23238* (2013.01); *H04N 5/232935* (2018.08); *G03B 2206/00* (2013.01)

(58) Field of Classification Search
  USPC .............................. 348/143, 158, 159, 211.8
  See application file for complete search history.

(56) References Cited

U.S. PATENT DOCUMENTS

| | | | |
|---|---|---|---|
| 9,348,198 B1* | 5/2016 | Adams | G03B 17/565 |
| 10,007,934 B2* | 6/2018 | Nguyen | G01N 21/95 |
| 2012/0262540 A1 | 10/2012 | Rondinelli | |

FOREIGN PATENT DOCUMENTS

| | | |
|---|---|---|
| JP | 2002 325160 | 11/2002 |
| JP | 2005 283871 | 10/2005 |
| KR | 2013 0043769 | 5/2013 |
| WO | 2009/029949 | 3/2009 |
| WO | 2015/128760 | 9/2015 |

* cited by examiner

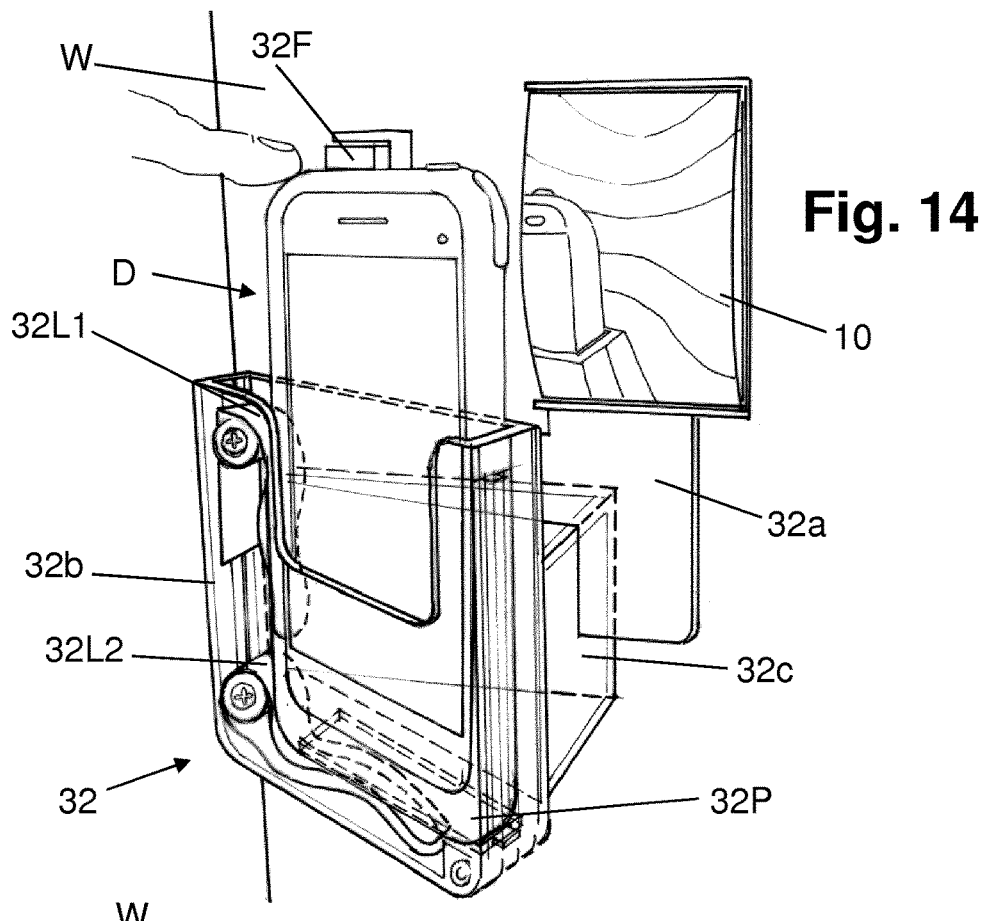
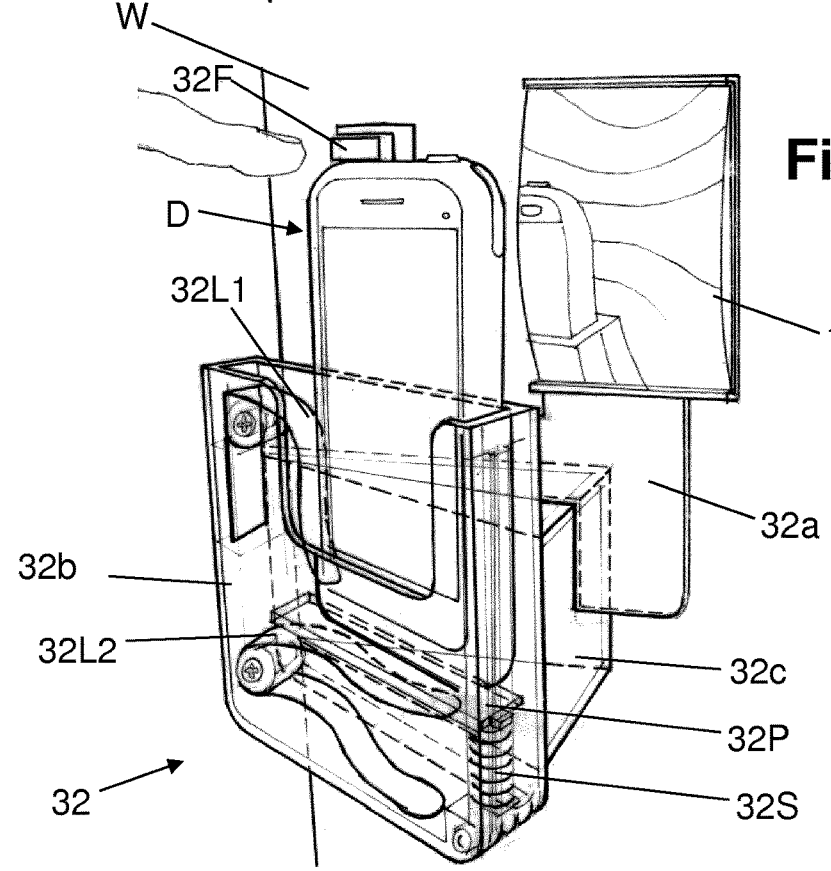

FITTING ROOM COMPRISING A PORTRAIT PHOTOGRAPHIC SYSTEM, AND A COMPUTER PROGRAM

CROSS-REFERENCE TO RELATED PATENT APPLICATIONS

This is a U.S. National Phase Application under 35 U.S.C. § 371 of International Patent Application No. PCT/EP2017/058151, filed Apr. 5, 2017, and claims priority to European Patent Application No. 16382151.5 filed Apr. 6, 2016, which is incorporated by reference in its entirety. The International Application was published on Oct. 12, 2017, as International Publication No. WO 2017/174677 A1.

TECHNICAL FIELD

The present invention generally concerns, in a first aspect, to a fitting room comprising a portrait photographic system allowing acquiring images of a user placed in front of a mirror with a built-in camera of a computing device, and more particularly to a system allowing the use of the built-in cameras of the personal portable computing devices of any of a plurality of users to perform the images acquiring.

A second aspect of the invention relates to a computer program comprising computer subprograms adapted to operate the system of the first aspect.

STATE OF THE ART

Several fitting room comprising portrait photographic systems are known in the art, including a mirror and a camera so that a user placed in front of the mirror can see her/his reflected image and capture one or more images of herself/himself showing the same pose adopted for the reflected image, by triggering the camera automatically or with the intervention of the user.

Some patent documents disclosing some of said known fitting rooms are, for example, EP1351172A1, WO2006021824 and KR20140018599.

All of the known systems included in the known fitting rooms include at least one camera unremovably attached to a structural member, such as the mirror, generally behind the mirror, which is a one-way mirror or has a through opening though which the camera acquires the images of the user.

In most of said known systems the camera is not a built-in camera of a portable computing device.

JP2002325160A discloses a fitting room with a portrait photographic system comprising a camera, which is not a camera of a portable computing device, installed on the back side of a mirror of the fitting room. At paragraph [0040], said document broadly states that the camera of the user's portable phone can be used, but the document is silent about any unconventional use of said portable camera phone, assuming therefore that only a conventional use would be implicitly disclosed, i.e. by the user holding the user's portable camera phone with his hands, or at most by using a conventional "selfie" stick.

International patent application WO2009029949A1 discloses a fitting room including an interactive display device which includes a camera fitted thereto and a computer terminal. Although, for an embodiment, a communication module of the computer terminal contains a mobile device component which can receive and send images taken by the camera fitted in the display, no mention regarding the inclusion or use of a camera built-in the mobile device module is done at all in said document.

International patent application WO2006021824 discloses a fitting room comprising a system where the camera is a built-in camera of a computer device particularly of what is called as a MMS terminal suitable for sending MMS through a mobile phone communication network. However, the camera is placed within the surface of a mirror, and hence the terminal including the camera is unremovably attached to that mirror, or, as stated in said document "locally installed".

Although WO2006021824 discusses the advantages that using a smartphone have for taking self-photographs (also known as selfies), particularly associated to the fact that the acquired images can be sent through a mobile phone communication network, the proposal made therein is focused on overcoming the disadvantages that the use of said smartphones have, when the users use their own smartphones for taking the self-photographs ("the distance between the camera and the user is limited by the arm's length so the user needs assistance provided by another person"). Hence, the solution proposed by WO2006021824 is to integrate one smartphone within the mirror, but once the smartphone is placed within the mirror it is not portable anymore, but on contrary it becomes a stationary computing device.

None of the known systems raises the problem associated to the fact that for fitting rooms (in most countries) it is legally forbidden to use a system including an attached camera, for privacy matters.

WO2006021824 includes the features defined in the preamble clause of claim 1 of the present invention, but said document does not only not raises the above mentioned problem (nor any technical problem associated thereto), but even teaches away from providing a solution to that problem, as the system proposed therein includes a stationary camera.

It is therefore necessary to provide an alternative to the state of the art which covers the gaps found therein, and provides a solution to the above mentioned problem.

DESCRIPTION OF THE INVENTION

To that end, the present invention relates, in a first aspect, to fitting room (also known as try-on rooms) comprising a portrait photographic system which comprises, in a known manner:

a mirror; and attaching means for attaching, with respect to said mirror, a computing device having at least one built-in camera, such that the built-in camera is positioned to acquire images of a user placed in front of said mirror.

In contrast to the prior art systems, in the system of the fitting room of the first aspect of the invention, in a characteristic manner, the computing device is a portable computing device having a built-in camera, and:

the above mentioned attaching means comprise a support physically attached to said mirror, or to a structural member (such as a wall) fixed thereto, said support being configured and arranged to interchangeably and removably attach thereto any of a plurality of said portable computing devices having built-in cameras (smartphones, tablets, etc.); and the system further comprises a local computing entity adapted to establish a communication link with the portable computing device attached or to be attached to said support, in order to acquire one or more images of a user placed in front of said mirror with the built-in camera of the portable computing device once attached to the support.

Hence, the system provided by the present invention constitutes a solution to the new technical problem associated to the above mentioned problem of forbiddance of using systems including attached cameras, for some applications.

For an embodiment, the system of the fitting room of the first aspect of the invention further comprising the portable computing device(s) removably attached to the support.

For an embodiment, said mirror is a full body or full length mirror, i.e. a mirror sized to reflect the whole body of the user placed in front thereof.

According to an embodiment, the above mentioned communication link is a wired or wireless communication bidirectional link, and the local computing entity and the portable computing device are adapted to automatically establish said wired or wireless communication bidirectional link with each other once the portable computing device is attached to said support or located within a determined area proximate thereto, to perform an univocal association between the local computing entity and the portable computing device, for at least identification purposes.

For some embodiments, said bidirectional link is a matching or pairing between the local computing entity and the portable computing device, or a simpler link, i.e. a link including a simpler negotiation.

Preferably, the communication bidirectional link is of a wireless type, such as a WiFi or Bluetooth link, or even a NFC link.

For an embodiment, the local computing entity is adapted to receive, through said communication bidirectional link, at least a user ID associated to the portable computing device, univocally associated therewith, or to an application program running in the portable computing device, and to identify and validate said user ID.

For an embodiment, the local computing entity and said portable computing device are adapted to automatically establish said wired or wireless communication bidirectional link with each other only if a signal indicative of the portable computing device being shaken is received by the local computing entity, the portable computing device including sensor means (such as an accelerometer) to detect its shaking and, in response to said detection, generate and send said signal to the local computing entity, and the local computing entity being adapted to receive and process said signal to automatically establish said wired or wireless communication bidirectional link.

For another embodiment, alternative or complementary to the above mentioned embodiment, the system of the fitting room of the first aspect of the invention further comprises a remote computing entity adapted to establish a bidirectional communication with the portable computing device and/or with the local computing entity, to receive at least a user ID associated to the portable computing device, univocally associated with the local computing device, or to an application program running in the portable computing device, and to identify and validate said user ID.

According to an embodiment, the local computing entity is adapted to control, by itself or under control of said remote computing entity, the at least one built-in camera of the portable computing device to acquire one or more images of a user located in front of the mirror.

Regarding the above mentioned support, for an embodiment, it preferably comprises a coupling arrangement for firmly coupling and holding the portable computing device in a proper position for acquiring images of the user.

For an embodiment, the support is movable among a plurality of positions about at least one horizontal axis under the control of the local computing entity, by itself or under control of the remote computing entity, once the user ID has been validated, synchronously with the acquiring of one or more images such that at least one image is acquired for each of said plurality of positions, so that a sequence of images covering different portions of the user along her/his height are acquired.

For an alternative embodiment, the support is stationary, the system including an optical element attached to the support such that it remains at a predetermined distance and orientation with respect to the built-in camera of the portable computing device attached to the support, to allow, with a single shot, acquiring at least one distorted image of the user including different portions along her/his height, preferably the full body thereof.

For a preferred variant of said embodiment, the above mentioned mirror is a main mirror and said optical element is a convex mirror with its convex side facing the user placed in front of the main mirror and also facing the built-in camera, which is a rear built-in camera, i.e. a camera aiming towards said convex mirror, the portable computing device comprising a front display touch screen displaying graphic elements provided by said application program when running in the portable computing device, including a virtual button to be pressed by the user in order to start a timer countdown to trigger said acquiring of at least one distorted image after a predetermined lapse of time enough as to allow the user to adopt the desired pose in front of the mirror, and also displaying the distorted reflection image of the user on the convex mirror or a preview undistorted image of the user generated by a pre-correction of the distorted image performed by the application program.

Other alternative optical elements are also covered for other variants of the above mentioned embodiment, including reflective and transmissive optical elements, or a combination thereof, such as prisms having appropriate shapes and refraction indexes to allow the acquiring of a distorted image covering different portions of the user with the built-in camera of the portable computing device attached to the support, or a flat mirror.

For another embodiment, the support is stationary and attached to the mirror, such that the mirror remains at a predetermined distance and orientation with respect to the built-in camera of the portable computing device attached to the support, to allow, with a single shot, acquiring at least one image of the user including different portions along her/his height.

According to another embodiment, the support is stationary and attached to the above mentioned structural member (such as a wall) or to the above mentioned mirror, the system including a separate optical element also attached to the structural member or to the mirror such that it remains at a predetermined distance and orientation with respect to the built-in camera of the portable computing device attached to the support, to allow, with a single shot, acquiring at least one distorted image of the user including different portions along her/his height.

For an implementation of said embodiment, the support and the optical element are attached to the structural member, said optical element is said mirror which is a convex mirror with its convex side facing the user placed in front of said structural member and also facing the built-in camera, which is aimed towards said convex mirror, the portable computing device comprising a front display touch screen displaying graphic elements provided by said application program when running in the portable computing device, including a virtual button to be pressed by the user in order to start a timer countdown to trigger said acquiring of at least one distorted image, and also displaying the distorted reflection image of the user on the convex mirror or a preview undistorted image of the user generated by a pre-correction of the distorted image performed by the application program.

For an alternative implementation of said embodiment, the above mentioned mirror is a main mirror (such as a full body or full length mirror) to which the support and the optical element are attached, wherein said optical element is a convex mirror with its convex side facing the user placed in front of said main mirror, and also facing the built-in camera, which is aimed towards said convex mirror, the portable computing device comprising a front display touch screen displaying graphic elements provided by said application program when running in the portable computing device, including a virtual button to be pressed by the user in order to start a timer countdown to trigger said acquiring of at least one distorted image, and also displaying the distorted reflection image of the user on the convex mirror or a preview undistorted image of the user generated by a pre-correction of the distorted image performed by the application program.

According to an embodiment, the support is configured and arranged to interchangeably and removably attach thereto any of a plurality of portable computing devices having different dimensions.

For different implementations of said embodiment, said mechanisms includes several elements, such as spring sheets, base platforms, springs, etc. which collaborate to adapt the support to different sizes of portable computing devices.

In order to adapt the system to portable computing devices differing at least in that their rear built-in cameras are placed in different positions, according to an embodiment, the optical element is movable with respect to the support, the system of the invention comprising driving means including an electric motor and a cinematic chain mechanically connected to the movable optical element, and a position sensor for detecting the position of the rear built-in camera of the portable computing device attached to the support, wherein the local computing entity is connected to the output of said position sensor and to the input of said electric motor to control the latter to move the optical element based on the detected position For an embodiment, the portable computing device is adapted to, once the user ID has been validated:

send the sequence of images or the at least one distorted image to the local computing entity or to the remote computing entity, and wherein the local computing entity or the remote computing entity is adapted to process the received sequence of images or the received distorted image to obtain a single panoramic image of the user from, respectively, a composition of the sequence of images or a distortion correction of the at least one distorted image; or process the acquired sequence of images or the acquired distorted image to obtain a single panoramic image of the user from, respectively, a composition of the sequence of images or a distortion correction of the at least one distorted image.

Additionally, for another embodiment, the system of the fitting room of the first aspect of the invention further comprises at least one tag code reader for reading ID tags attached to pieces of clothing worn by the user, wherein the local computing entity and/or the remote computing entity are connected to the output of said at least one tag code reader, or implement a portion thereof, to obtain ID data identifying the pieces of clothing worn by the user placed in front of the mirror, in order to associate said ID data to the image or images of the user acquired or to be acquired.

The first aspect of the invention is a preferred and relevant application of the portrait photographic system, because in most countries placing cameras within fitting rooms is illegal, for privacy matters, and hence the invention provides an acquiring of portrait images of users trying on different pieces of clothes with their own portable computing devices, such as smartphones, but with a much higher quality than the one which can be obtained with a simple selfie performed by the user by holding a smartphone directly with his hands or with a selfie stick, and where the acquired images do not show the user adopting a strange pose as it happens when she/he is holding the smartphone but the same pose as she/he sees reflected on the mirror.

Moreover, fitting rooms are usually of small dimensions, i.e. they enclose small spaces, so that the distance from the mirror and the user is too small as to acquire a full-body image thereof with the camera of a smartphone. Therefore, the above described embodiments regarding the obtaining of a panoramic image of the user are of particular interest for the first aspect of the invention, i.e. for the application of the system to a fitting room.

Other aspects of the invention, alternative to said first aspect, relate to different applications of the system of the fitting room of the first aspect of the invention, such as other kind of rooms, cabins or booths where is also forbidden to attach a camera there within or, although not forbidden, is of interest to provide such kind of booths with the system of the present invention for allowing the users to use their own portable computing devices built-in cameras to perform portrait photos.

For example, current phot booths could be substituted by a booth including the system of the present invention.

All of the above described embodiments of the system of the fitting room of the first aspect of the invention are valid to corresponding embodiments of a portrait photographic system not included in a fitting room.

Such a portrait photographic system not included in a fitting room can be used also for domestic applications, i.e. it can be implemented by the user at her/his own home, and also for indoor and outdoor applications not necessarily inside a booth.

One of said indoor applications could be the implementation of one or preferably more systems according to the first aspect of the invention in a museum or similar venues, in front of backgrounds of interest (such as pictures, statues, etc.), such that a user placed in front of the mirror knows that by using the system of the invention she/he will get one or more portrait photos of herself/himself with the specific background just as reflected on the mirror.

Similarly, the system of the invention can be used for outdoor applications, as described in the above paragraph but where the backgrounds could be, for example, P.O.I.s (Points Of Interest) of a city, such as famous buildings, monuments or other tourist attractions.

A further aspect of the invention relates to an alternative system differing from the system of the fitting room of the first aspect in that it does not include the mirror. Instead, the support is attached to a structural member, such as a stand, pole, board, etc., or not attached at all, in this latter case constituting a portable support.

An additional aspect of the invention relates to a support having the features of the support of the system of the fitting room of the first aspect of the invention.

For an embodiment of said additional aspect of the invention, the support is a portable support.

For a variant of said embodiment, the support includes attaching means (such as an adhesive layer, suction cups, etc.) to be attached (preferably in a removable manner) to any place considered appropriate by the user, such as a mirror, stand, board, etc.

A second aspect of the invention relates to a computer program comprising computer subprograms including code instructions that when executed on respective processors of at least the portable computing device and the local computing entity of the portrait photographic system of the fitting room of the first aspect of the invention perform the operations thereof involving the portable computing device and the local computing entity, including the above mentioned communication link establishment and image acquiring.

The subprogram executed in the processor of the portable computing device is preferably implemented in the form of the above mentioned application program, through which the user (if allowed, i.e. if her/his user ID is validated) can access to and interact with the service provided by the system, i.e. to the acquiring of portrait images and subsequent delivering, processing and storing of the images, locally and, preferably, remotely (for example in a cloud server) in order to share them with people belonging to a virtual community or social network to ask for their opinion about the images.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which:

FIG. 14 is a front perspective view of the same elements shown in FIG. 13, but which differs there from in that a bigger smartphone is partially housed inside the pocket-type coupling arrangement of the support;

FIGS. 15a, 15b and 15c show the same elements and embodiment as in FIG. 13, for different positions of the smartphone with respect to the support, illustrating a sequence of movements for extracting the smartphone from the pocket-type coupling arrangement of the support;

DETAILED DESCRIPTION OF SEVERAL EMBODIMENTS

Figure 1:
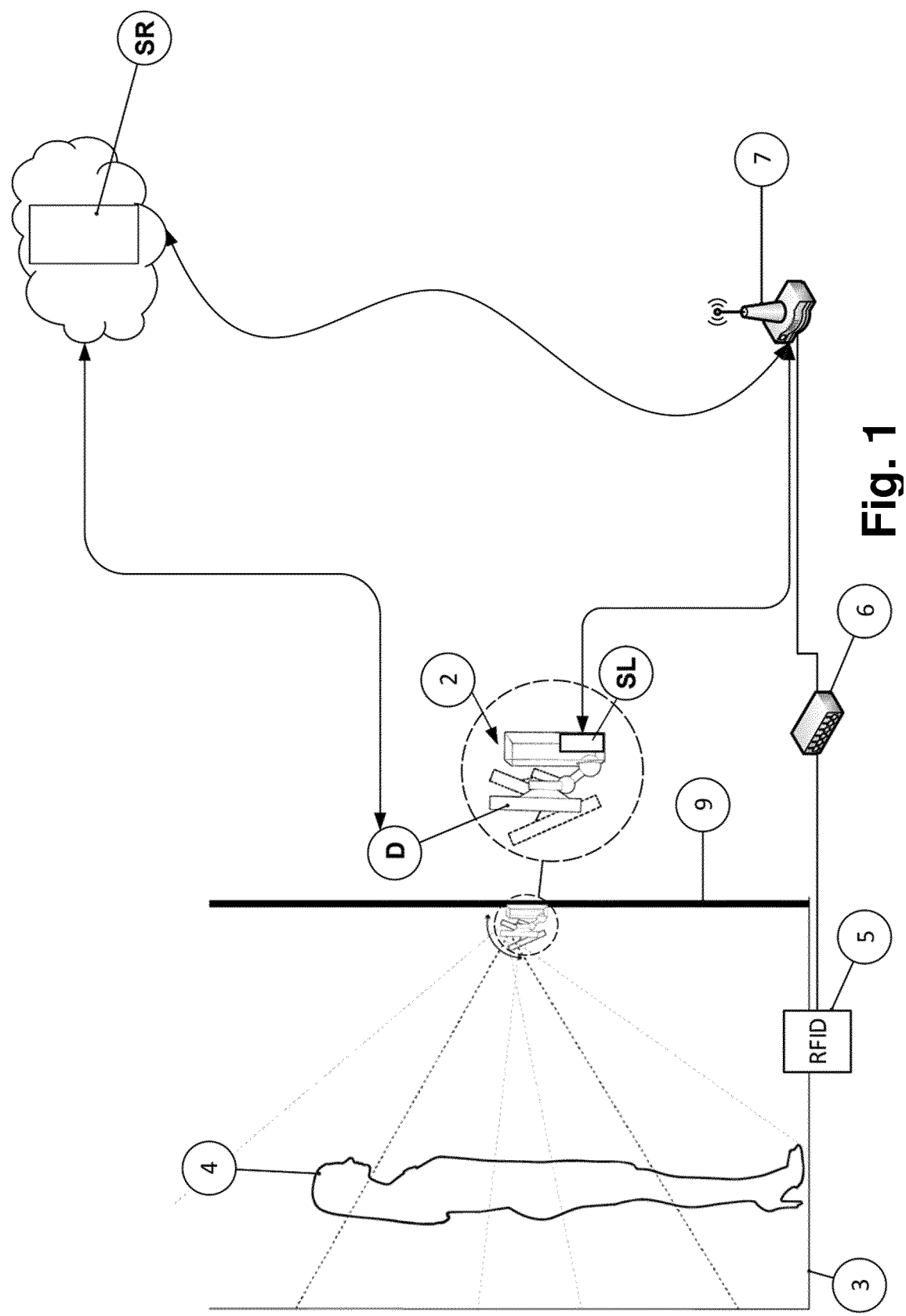
FIG. 1 schematically depicts the system of the fitting room of the first aspect of the present invention applied to a fitting room, according to the first aspect of the invention, for an embodiment.
Figure 4:
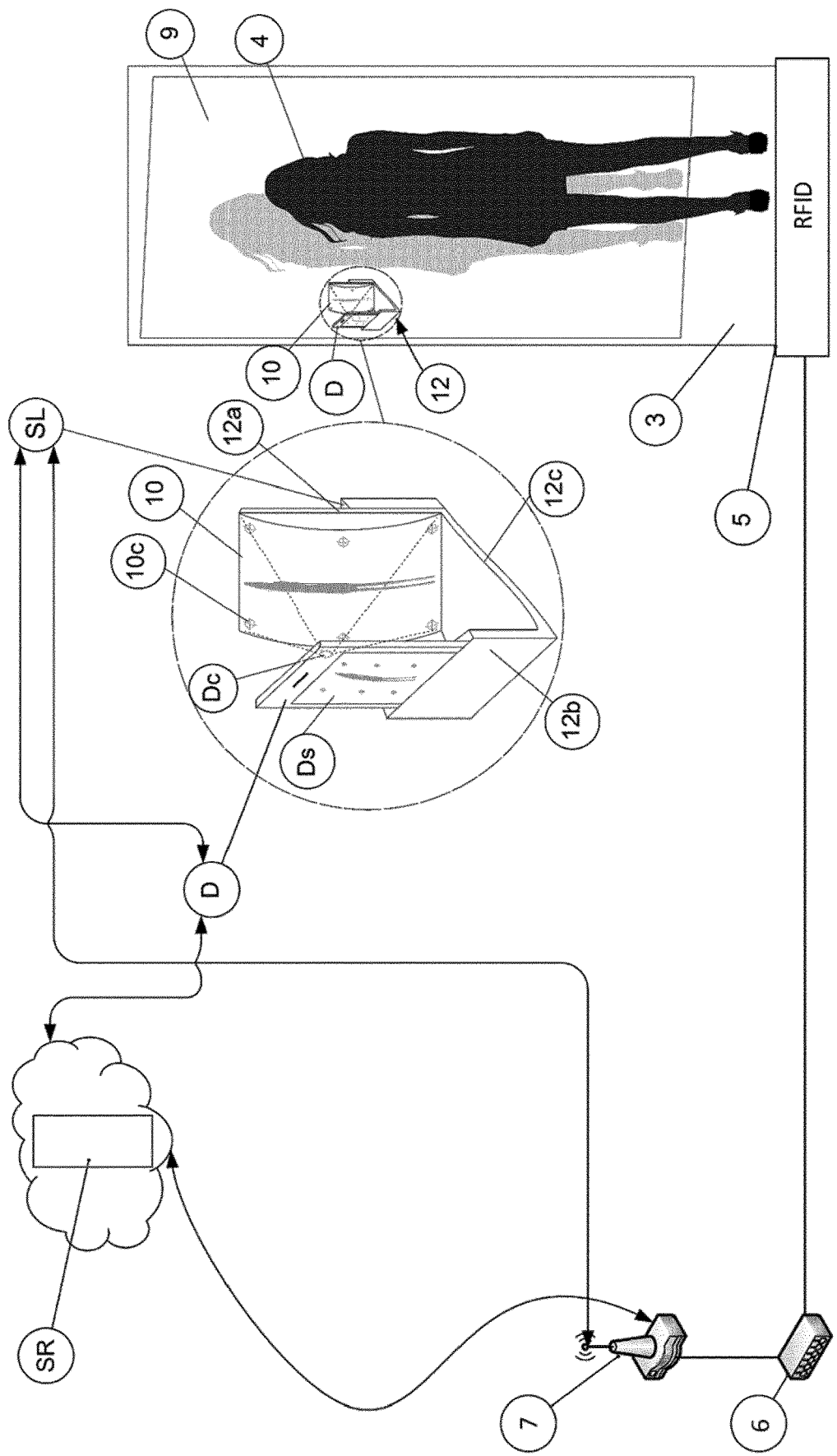
FIG. 4 schematically shows the system of the fitting room of the first aspect of the present invention applied to a fitting room, according to the first aspect of the invention, for another embodiment.

Two alternative embodiments of the fitting room of the first aspect of the invention are depicted in FIGS. 1 and 4.

For both of said alternative embodiments, the system is applied to a fitting room 3 into which a user 4 is placed, and comprises:

a mirror 9, in front of which the user 4 is placed;

a support 2, 12 physically attached to the mirror 9, and being configured and arranged to interchangeably and removably attach thereto any of a plurality of portable computing devices D having built-in cameras Dc (in the Figures, a smartphone D is attached to the respective support 2, 12);

a local computing entity SL adapted to establish a communication bidirectional link (preferably wireless, such as WiFi, Bluetooh or NFC) with the portable computing device D attached or to be attached to the support 2, 12; and a remote computing entity SR (such as a cloud server) adapted to establish a bidirectional communication (as indicated by the illustrated arrow lines) with the portable computing device D (for example via a 3G or 4G mobile phone communication network) and with the local computing entity SL, in the latter case via a WiFi access router 7 connected to the remote computing entity SR via a wired (for example, an ADSL or fiber-optic connection) or wireless communication network.

Any other type of communication technology and/or protocol can be used, alternatively to the ones mentioned above, for the mentioned bidirectional communications.

For both, FIGS. 1 and 4, the system there illustrated includes (optionally) a RFID tag code reader for reading RFID tags (not shown) attached to pieces of clothing worn by the user. Said RFID tag code reader includes one or more RFID antennae 5 connected to a RFID hub 6, collaborating for performing the RFID tag reading operations. The RFID hub 6 sends the RFID data to the remote computing entity SR, in this case via access router 7, directly or through local computing entity SL, the remote computing entity SR using the received data in order to associate said RFID data to the image or images of the user acquired or to be acquired.

Alternatively, the local computing entity SL performs at least part of the RFID reading process from data received from the RFID hub 6.

Figure 2:
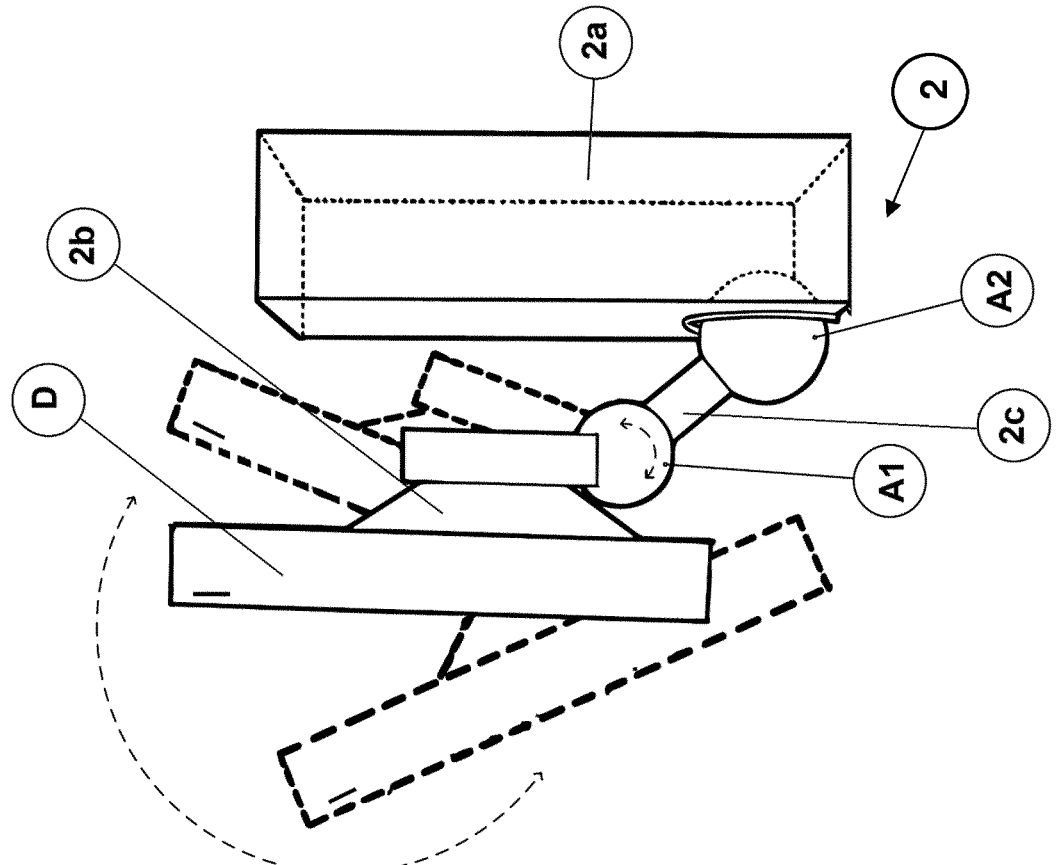
FIG. 2 is an enlarged view of the support and smartphone shown in FIG. 1, where different rotation positions thereof are depicted.

For the embodiment of FIG. 1, as shown in detail in FIG. 2, the support 2 is movable among a plurality of positions about at least one horizontal axis, as schematically illustrated in FIG. 2, in this case by means of a first articulation joint A1 between a portion 2b of the support 2, constituting or comprising a coupling arrangement, attached to the smartphone D, and an arm 2c attached to another portion 2a of the support 2 to be attached to the mirror 9.

For the embodiment illustrated in FIG. 2, arm 2c is attached to portion 2a through a further articulation joint A2, in this case a ball joint which allows to move arm 2c (and hence support portion 2b and smartphone D) about further rotation axis (manually or automatically).

Both, arm 2c and articulation joint A2, are optional elements, i.e. for a non-illustrated embodiment support 2 comprises portion 2b directly attached to portion 2a through articulation joint A1.

Figure 3:
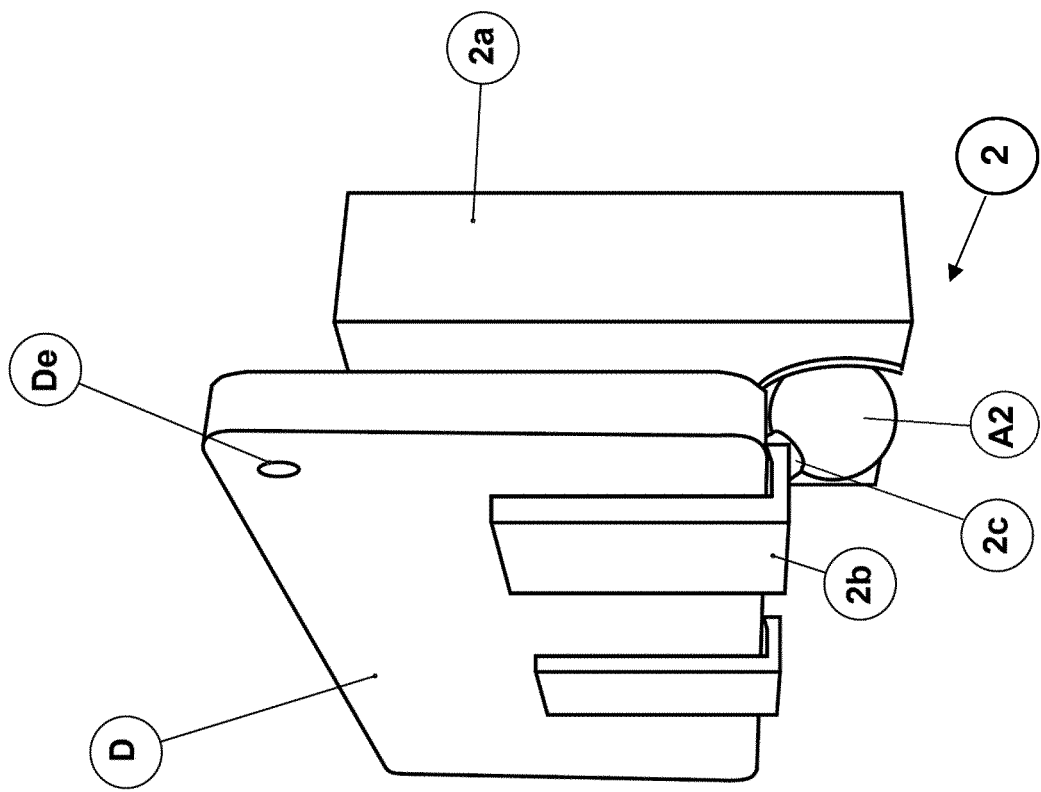
FIG. 3 is a perspective view of the support of the system of the fitting room of the first aspect of the invention attached to a smartphone by means of a specific clamping arrangement, for an embodiment.

Support 2 comprises a coupling arrangement 2b for firmly coupling and holding the portable computing device D in a proper position for acquiring images of the user. For the embodiment illustrated in FIG. 3, said coupling arrangement 2b is implemented by means of two elastic clamping arms having an L-shaped cross-section, in order to allow (as illustrated) to hold the smartphone D without interfering in the field view of the built-in camera De, for a plurality of different portable computing devices D having their built-in cameras De in different positions.

Any other alternative coupling arrangement (meeting the requirements of not interfering in the field of view of the camera De) can be included in the system of the fitting room of the present invention, for non-illustrated embodiments, differing from the illustrated one in the number, shape and constitution of coupling elements and/or in the kind of coupling elements (suction-cups, magnets, etc.).

For the embodiments illustrated in FIGS. 1 and 4, the local computing entity SL is illustrated in the form of a single block placed within or attached to support portion 2a, 12a, although for other embodiments said entity SL is not placed within or attach to any portion of support 2, 12, but placed, at least in part, separated from the support 2, 12, although, for the embodiment of FIG. 1, being connected with an electric motor (not shown) kinematically connected to articulation joint A1 or to support portion 2b to automatically rotate it about an horizontal axis.

Figure 6:
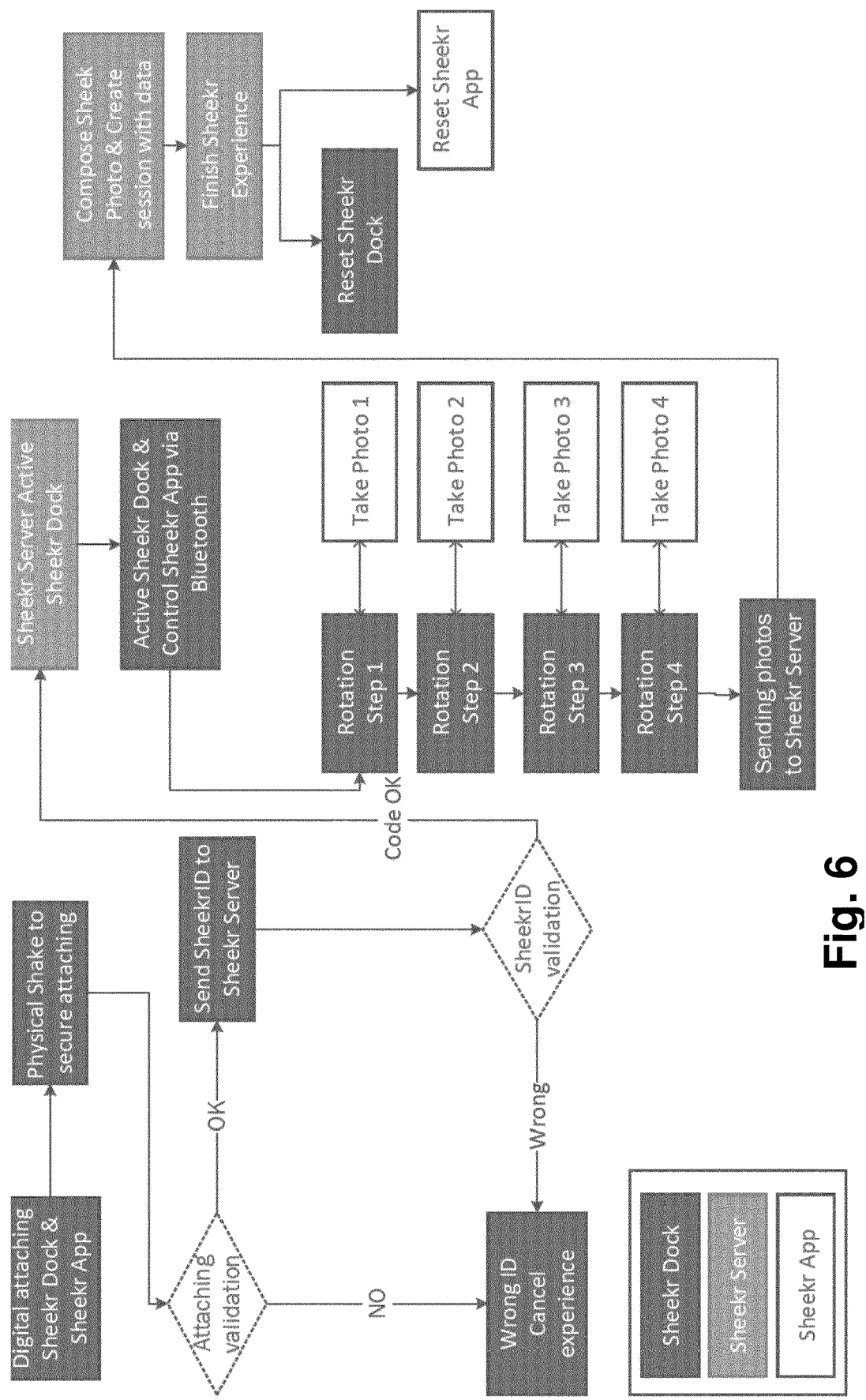
FIG. 6 is a flowchart showing a possible operation process of the system of the present invention for the embodiment shown in FIG. 1, but without the inclusion and/or operation of the elements identified by the numerals 5 and 6 in said Figure.

A flowchart showing a possible operation process of the system of FIG. 1 is shown in FIG. 6, where the local computing entity SL has been renamed as "Sheekr Dock", the application program running in the portable computing device D is referred as "Sheekr App" and the remote computing entity SR has been renamed as "Sheekr Server".

In the flowchart, the operations performed by the "Sheekr Dock" are illustrated in dark grey, the operations carried out by the Sheekr Server by light grey, and the ones performed by the "Sheekr App" in white.

The user uses the "Sheekr App" to access to the service or "experience" provided by the system, i.e. said app is executed (manually or automatically) when the user approaches or enters the fitting room.

According to the flowchart of FIG. 6, first, the above mentioned bidirectional link, here called as "digital attaching", is realised between "Sheekr Dock" and "Sheekr App". A physical shake of the portable device D is performed to secure the attaching, i.e. to confirm/validate that the device D "digitally attached" (through its "Sheekr App") to "Sheekr Dock" is the one of the user placed in front of the mirror 9, in order to avoid, for example, an undesired digital attaching to a device D of a person placed near the "Sheekr Dock" which is not the user (in this case, said digital attaching would have been established automatically when the portable deice D of said other user is within the coverage field of (for example) a WiFi transceiver of the "Sheekr Dock" used for said digital attaching).

If that digital attaching is not validated (generally by the "Sheekr Dock"), the "experience" is cancelled.

If the digital attaching is validated, the "Sheekr Dock" automatically sends to the "Sheekr Server" the user ID, indicated as "Sheekr ID", which has been retrieved through the link provided by the digital attaching. Said validation is generally performed by the "Sheekr Server". The "Sheekr Server" also "knows" the identity of the "Sheekr Dock", as that identity is inferred from the communication through which the latter send the "Sheekr ID" to the "Sheekr Server".

If the "Sheekr ID" is not validated (wrong ID or unauthorised user), then the "experience" is cancelled.

If the "Sheekr ID" is validated, then the "Sheekr Server" activates the "Sheekr Dock", the latter then controlling both the electrical motor (not shown) for moving the support 2 and the portable device attached thereto and also the operation of the built-in camera De of the portable device D, through the control of the "Sheekr App" (for example, via Bluetooth), such that after a first rotation step is performed a first photo of the user is taken, and so on until a fourth (or another number) rotation and photo are performed.

Once, all the photos are taken, preferably covering the full body of the user 4, they are sent by the "Sheekr Dock" to the "Sheekr Server", the latter composing the panoramic image of the user therefrom, and, optionally, creating a user session with associated data (such as metadata) to the created image.

Then, the "experience" is finished, and the "Sheekr Dock" and "Sheekr App" are reset, or their operation is just stopped.

The panoramic image can be downloaded to the portable device D and/or be made accessible to other users, such as users of a social network or community, in order to allow them to rank and/or express their opinion about it.

Figure 7:
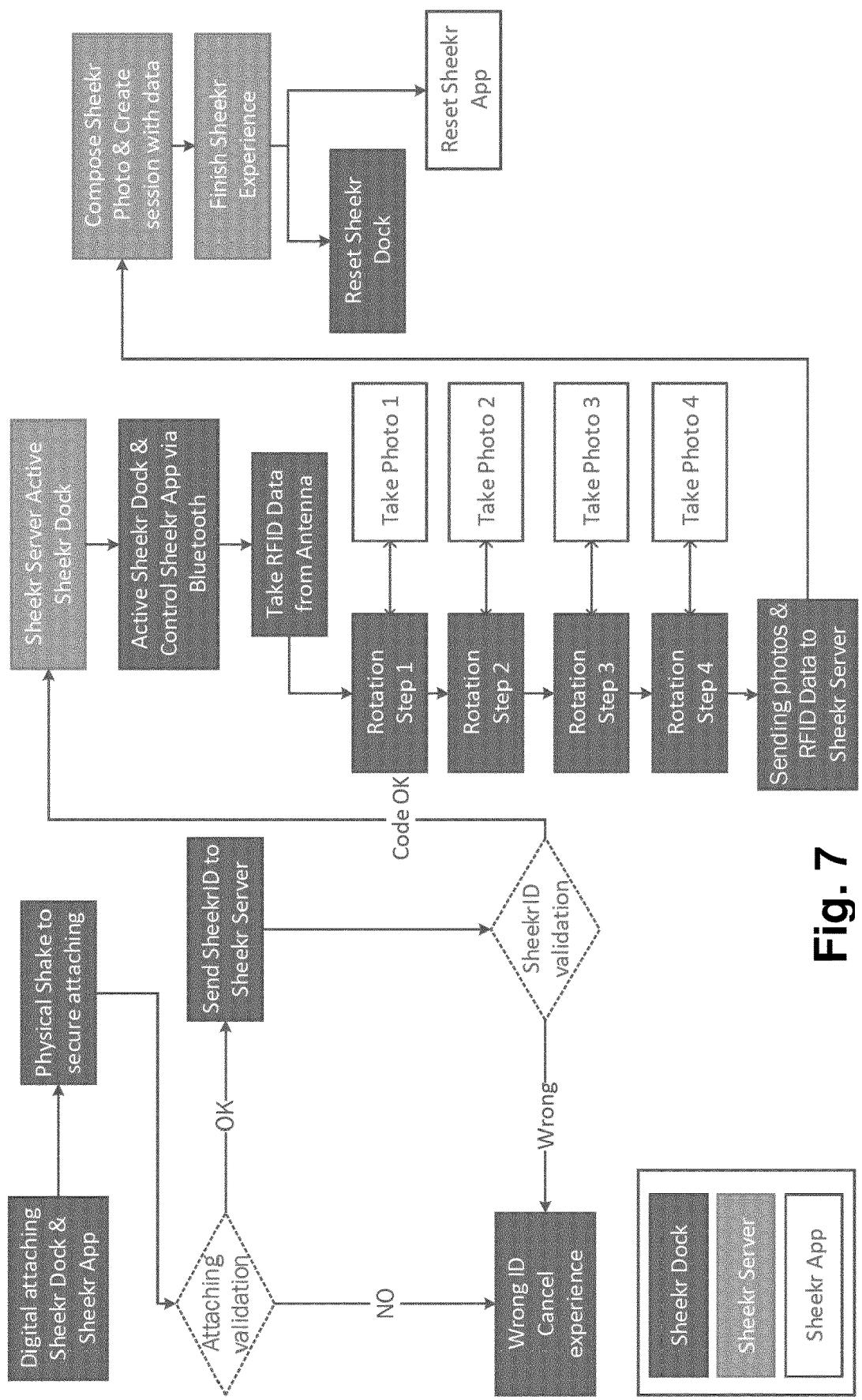
FIG. 7 is a flowchart similar to the one of FIG. 6, also applied to the embodiment of FIG. 1, but including the operation of said 5 and 6 elements, i.e. actions associated to an RFID reading process.

FIG. 7 shows a flowchart also regarding a possible operation process of the system of FIG. 1, which is very similar to the one of FIG. 6, but including also the use of above mentioned RFID tag reader 5, 6.

The flowchart of FIG. 7 includes the same steps as the flowchart of FIG. 6, with the addition of a further step for taking RFID data from antenna 5, performed according to the illustrated diagram before the rotation of the support and the taking of the photos, although for other embodiments it can be performed after or simultaneously there with.

The flowchart of FIG. 7 differs from the one of FIG. 6 also in that in the step for sending the photos to the "Sheekr Server" the RFID data is also sent thereto, the "Sheekr Server" associating the received RFID data to the panoramic image, such that the pieces of clothing there depicted are duly identified, and features associated thereto (price, size, model, colour, etc.) can thus be made virtually accessible to the user and/or to the users of a social network or community.

FIG. 4 shows another embodiment of the first aspect of the invention, differing from the one of FIG. 1 especially in that the support 12 is stationary and structurally different, and in that the system comprises an optical element 10 attached to the support 12 such that it remains at a predetermined distance and orientation with respect to the built-in camera Dc of the portable computing device D attached to the support 12, to allow, with a single shot, acquiring at least one distorted image of the user including different portions along her/his height, preferably her/his full body.

Figure 5:
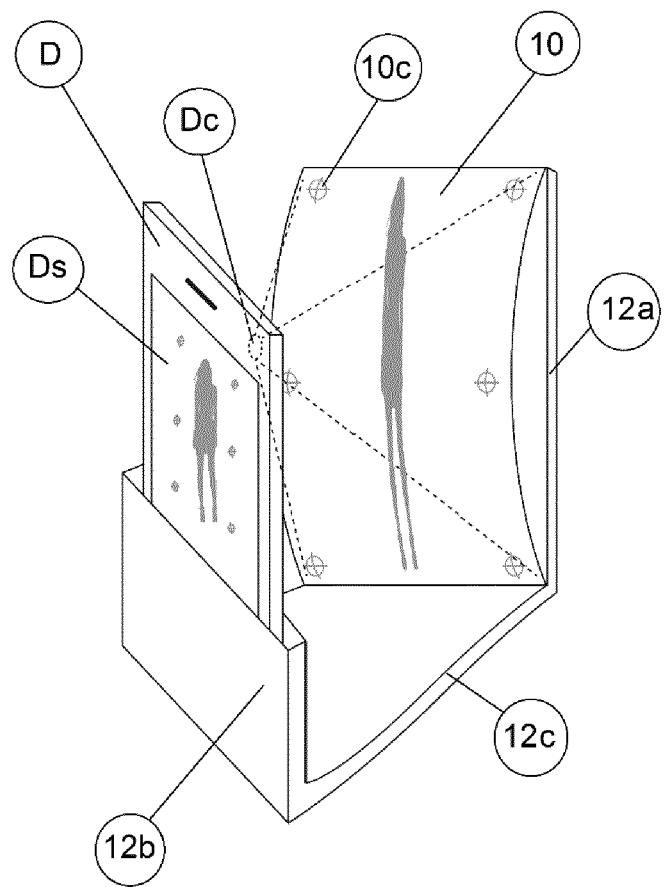
FIG. 5 is an enlarged view of the support, convex mirror and smartphone shown in FIG. 4.

Particularly, as shown in FIG. 4 and more clearly in FIG. 5, said optical element 10 is a convex mirror with its convex side facing the user placed in front of the main mirror 9 and also facing the built-in camera Dc, which for the illustrated embodiment is a rear built-in camera (i.e. a built-in camera aiming at the surroundings of the rear side of the portable computing device D, as understood in the art by the terms "rear built-in camera"), such that the user can see in the front display touch screen Ds of the illustrated smartphone D the distorted reflection image of the user on the convex mirror 10, as shown in FIG. 4, or, preferably, a preview undistorted image of the user generated by a pre-correction of the distorted image performed by the application program, as shown in FIG. 5.

Convex mirror 10 includes some reference marks 10c which will be used to aid in the process to correct the distortion of the distorted acquired image in order to obtain a panoramic image therefrom.

In use, the front display touch screen Ds of the smartphone D will also display several graphic elements provided by the application program running therein, including a virtual button to be pressed by the user in order to start a timer countdown to trigger the acquiring of the one or more distorted images after a predetermined lapse of time.

Support 12 also comprises, as shown in FIGS. 4 and 5, a coupling arrangement 12b for firmly coupling and holding the portable computing device D in a proper position for acquiring images of the user. In the illustrated embodiment, said coupling arrangement 12b is a pocket-type coupling arrangement into which a lower portion of the smartphone D is housed and held, although for other non-illustrated embodiment other types of coupling arrangements can be used (clamps, magnets, suction-cups, etc.).

As shown in FIGS. 4 and 5, the above mentioned predetermined distance between the convex mirror 10 and the camera Dc, is defined by the length of the support bridge portion 12c which separates the pocket-type coupling arrangement 12b and the back wall 12a onto which the convex mirror 10 is attached. The above mentioned predetermined orientation is, in this case, determined by the angle defined, at least in the horizontal plane, between the convex mirror 10 and the major faces of the pocket-type coupling arrangement 12b, and thus of the smartphone D and camera Dc.

The predetermined distance and orientation, and also the convexity of the convex mirror 10, are calculated to allow the reflection of the user 4 on the convex mirror 10 without the smartphone D interfering in between, to direct the reflected light towards the camera Dc of the smartphone D such that it can acquire an image of the user as reflected on the convex mirror 10, and to allow the reconstruction of the panoramic image by correcting the image distortion by image processing preferably by using the reference marks 10c.

Other embodiments of the first aspect of the present invention are shown in FIGS. 11 to 16, specifically related to different kinds of supports for the smartphones D including rear built-in cameras Dc, and, in some cases, also of mirrors.

Figure 10:
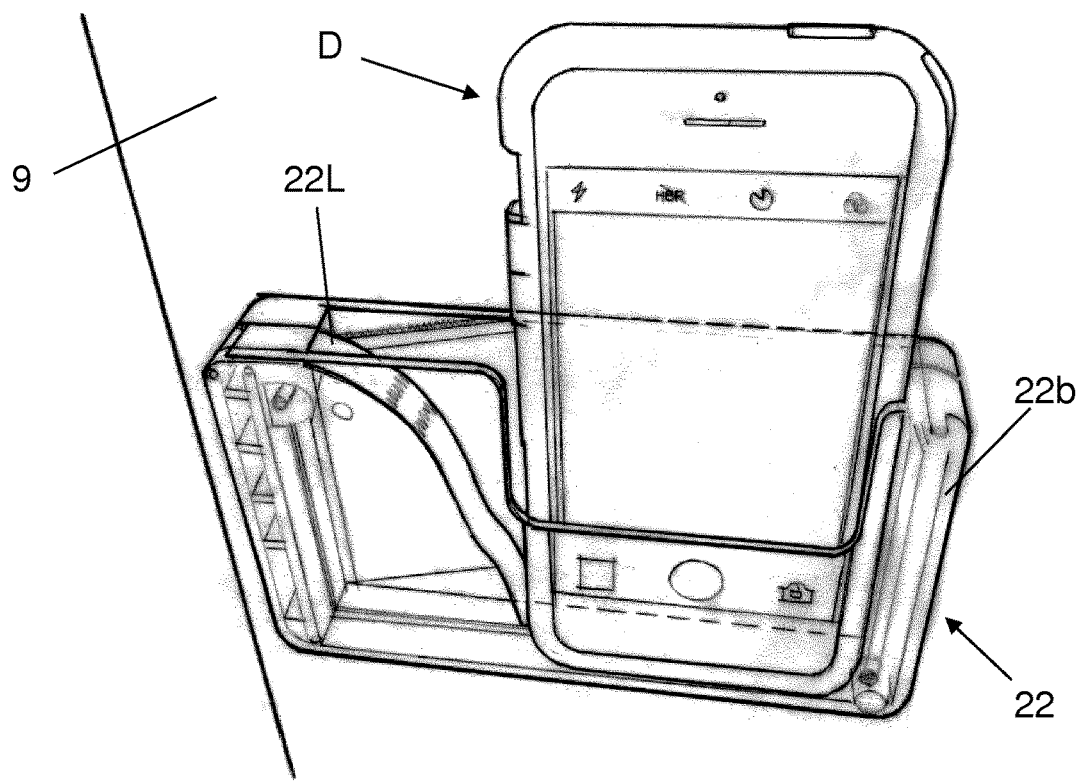
FIG. 10 is a front perspective view of the support of the fitting room of the system of the first aspect of the invention including a pocket-type coupling arrangement into which a lower portion of the smartphone is housed and held by means of a spring sheet, for an embodiment.
Figure 11:
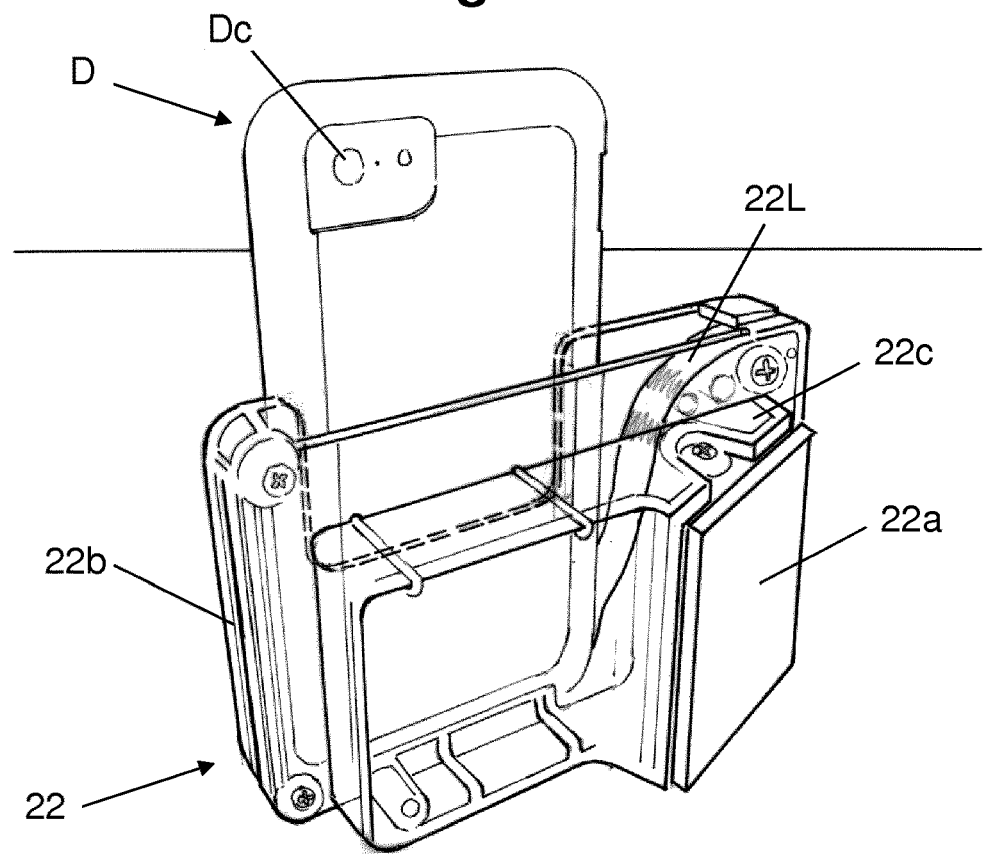
FIG. 11 is a rear perspective view of the support and smartphone of FIG. 10, for the same embodiment.

For the embodiment shown in FIGS. 10 and 11, the support 22 includes a pocket-type coupling arrangement 22b into which a lower portion of the smartphone D is housed and firmly held by means of a spring sheet 22L.

The support 22 also includes a back portion 22a to be attached to a mirror 9, and an intermediate portion 22c which separates the pocket-type coupling arrangement 22b and the back portion 22a such that the latter is distanced and oriented appropriately to allow the acquiring of portrait photographic images of a user placed in front of mirror 9.

Figure 12:
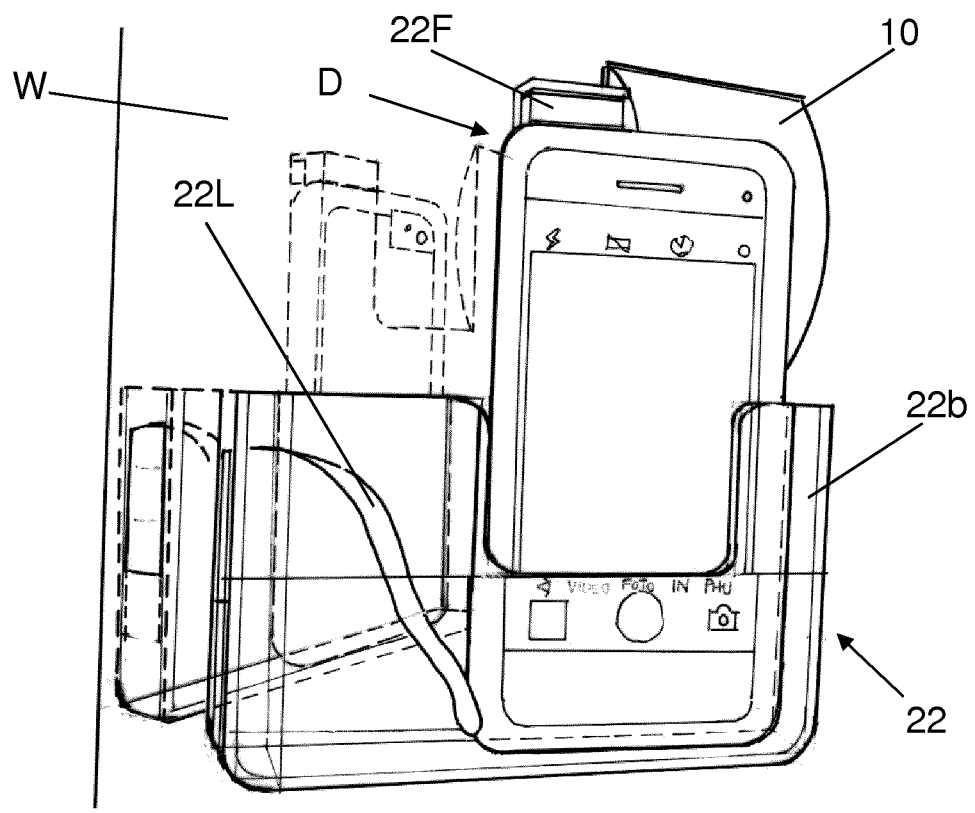
FIG. 12 is a front perspective view of a support similar to that of FIG. 10 but also including, attached thereto, a convex mirror and a retaining finger with a lip portion for retaining the smartphone by its top edge housed in the pocket-type coupling arrangement.

For the embodiment shown in FIG. 12, the support 22 differs from the one of FIGS. 10 and 11 in that a convex mirror 10 is attached thereto, particularly to a back portion 22a, and also in that the support 22 also includes in said back portion 22a a retaining finger with a lip portion 22F for retaining the smartphone D by its top edge housed in the pocket-type coupling arrangement 22b.

Figure 13:
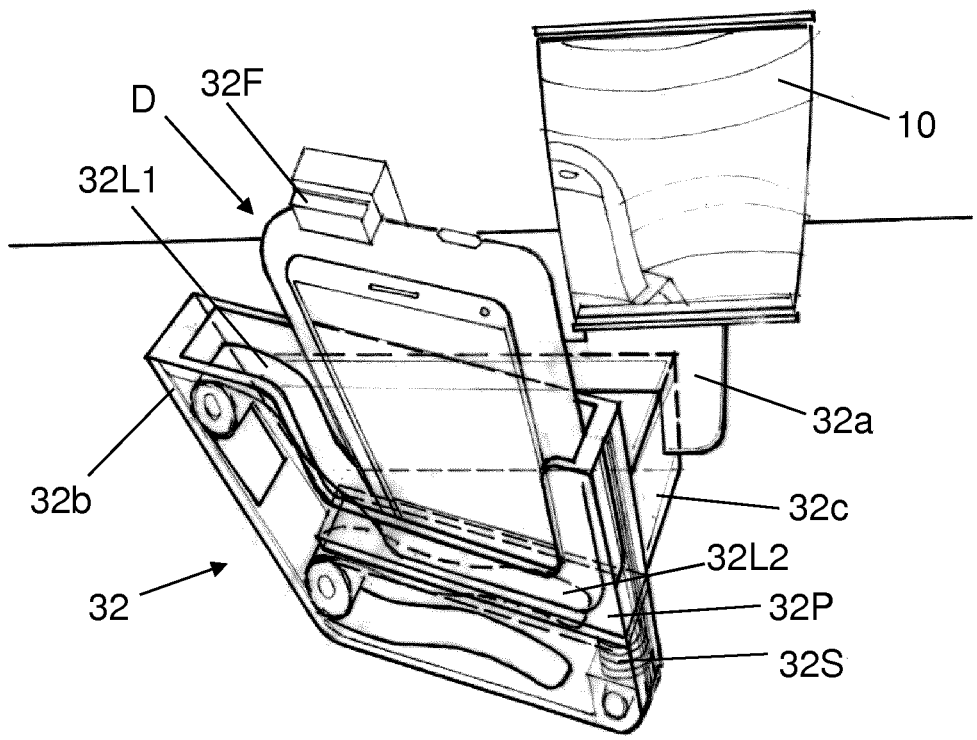
FIG. 13 is a front-top perspective view of the same elements shown in FIG. 12, but for another embodiment for which the support further includes, within the pocket thereof, a mechanism for adapting the support to alternately house different sizes of smartphones.

The embodiment shown in FIG. 13 differs from the one of FIG. 12 in that the front portion or pocket-type coupling arrangement 32b of the support 32 includes a mechanism for adapting the support to alternately house smartphones having different sizes.

For the illustrated embodiment, said mechanism comprises a base platform 32P supporting the smartphone by its bottom, and said base platform 32P is arranged over spring elements, particularly spring 32S and spring sheet 32L2 (although for other non-illustrated embodiments other types and/or number of springs could be used), such that the base platform 32P is pushed downwards by the smartphone D during the insertion thereof into the pocket-type coupling arrangement 32b, and, thanks to the spring effect, pushes the smartphone D upwards until the upper edge of the smartphone D abuts against the lip portion 32F of the retaining finger, being thus the smartphone D held by the base platform 32P, said lip portion 32F and the spring sheet 32L1.

For the embodiment illustrated by FIG. 13, a convex mirror 10 is also attached to a back portion 32a of the support 32, and the support 32 includes an intermediate portion 32c which separates the pocket-type coupling arrangement 32b and the back portion 32a such that the latter is distanced and oriented appropriately to allow the acquiring of portrait photographic images of a user placed in front of, for example, a wall or mirror onto which the support 32 is attached.

FIG. 14 shows the same embodiment as in FIG. 13, but with a bigger smartphone D partially housed inside the pocket-type coupling arrangement 32b of the support 32 and held by the base platform 32P, the lip portion 32F and the spring sheet 32L1. The illustrated smartphone D is wider and longer than the one illustrated in FIG. 13, so that the base platform 32P is pushed downwards, against the elastic force of spring sheet 32L2 and spring 32S, closer to the bottom of the pocket-type arrangement 32b than in the embodiment of FIG. 13, and the spring sheet 32L1 is bent more than in the embodiment of FIG. 13.

Figure 15B:
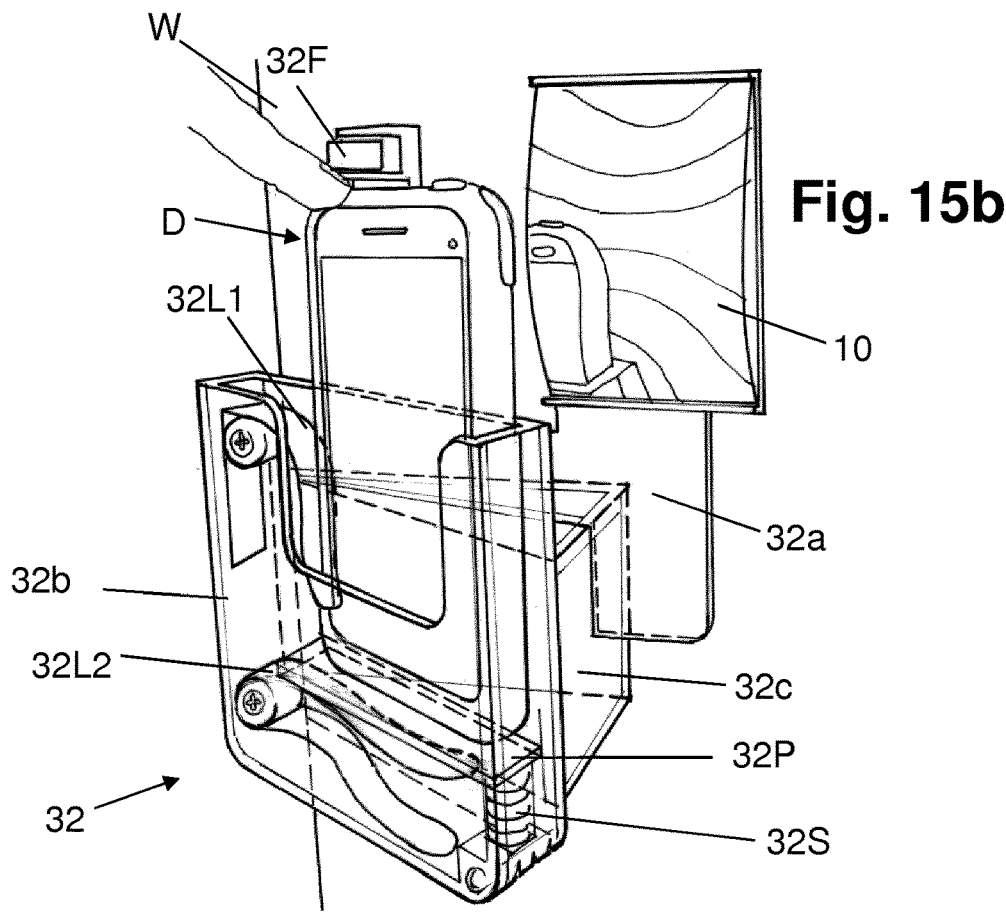
Figure 15C:
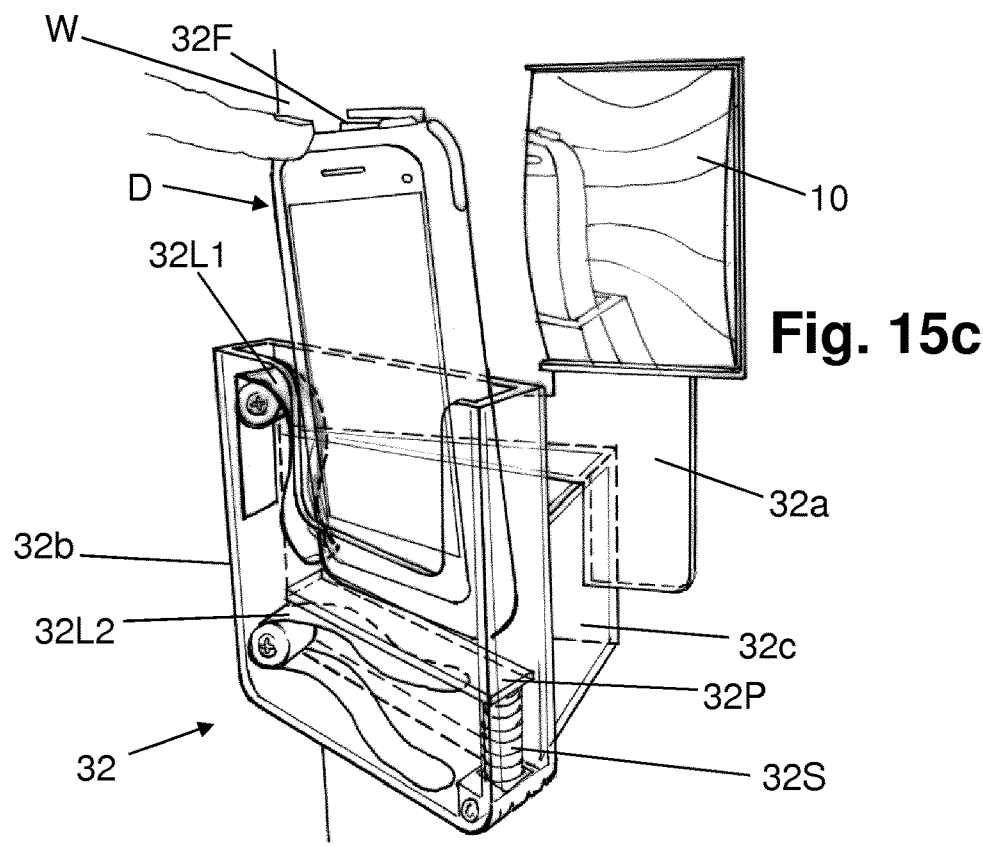

FIGS. 15a, 15b and 15c show the same elements and embodiment as in FIG. 13, for different positions of the smartphone D with respect to the support 32, illustrating a sequence of movements for extracting the smartphone D from the pocket-type coupling arrangement 32b of the support 32, which starts when a user approaches his finger to the upper edge of smartphone D (FIG. 15a), and follows by the user exerting a pressure with his finger against the upper edge of the smartphone D, so that the smartphone D is pushed downwards against the elastic force of spring 32S and spring sheet 32L2. Then, as shown in FIG. 15c, the user slightly pulls the smartphone D in a direction away from the lip portion 32F, such that the upper edge of the smartphone D is released from the retention of lip portion 32F and is pushed upwards by the base platform 32P so that it can be extracted from the pocket-type coupling arrangement 32b.

Figure 16:
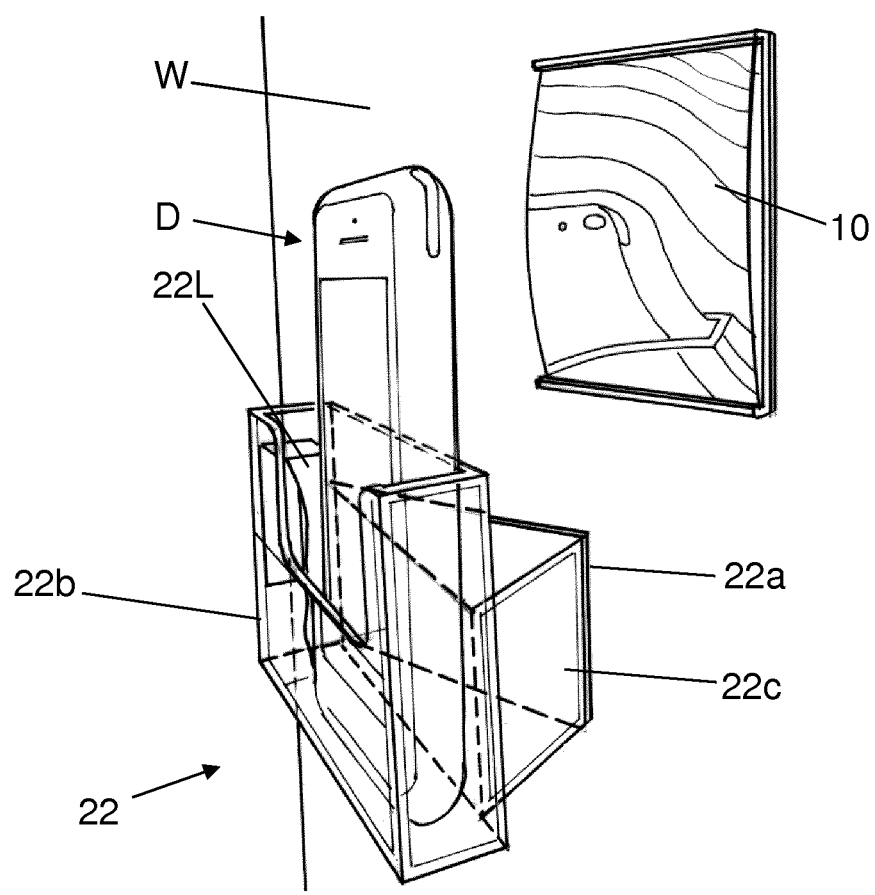
FIG. 16 shows, by means of a perspective view, a smartphone attached to a support similar to the one shown in FIG. 10 and a convex mirror, both attached to a common surface, such as a wall or a bigger mirror, for another embodiment of the fitting room of the first aspect of the invention.

Another embodiment is shown in FIG. 16 shows, for a support 22 similar to the one shown in FIG. 10, to which a smartphone D is attached, but with a separate convex mirror 10, both attached to a common surface, such as a wall W or a bigger mirror, at calculated relative positions and with appropriate relative orientations to allow the acquiring of portrait photographic images of a user placed in front of wall W.

Figure 17A:
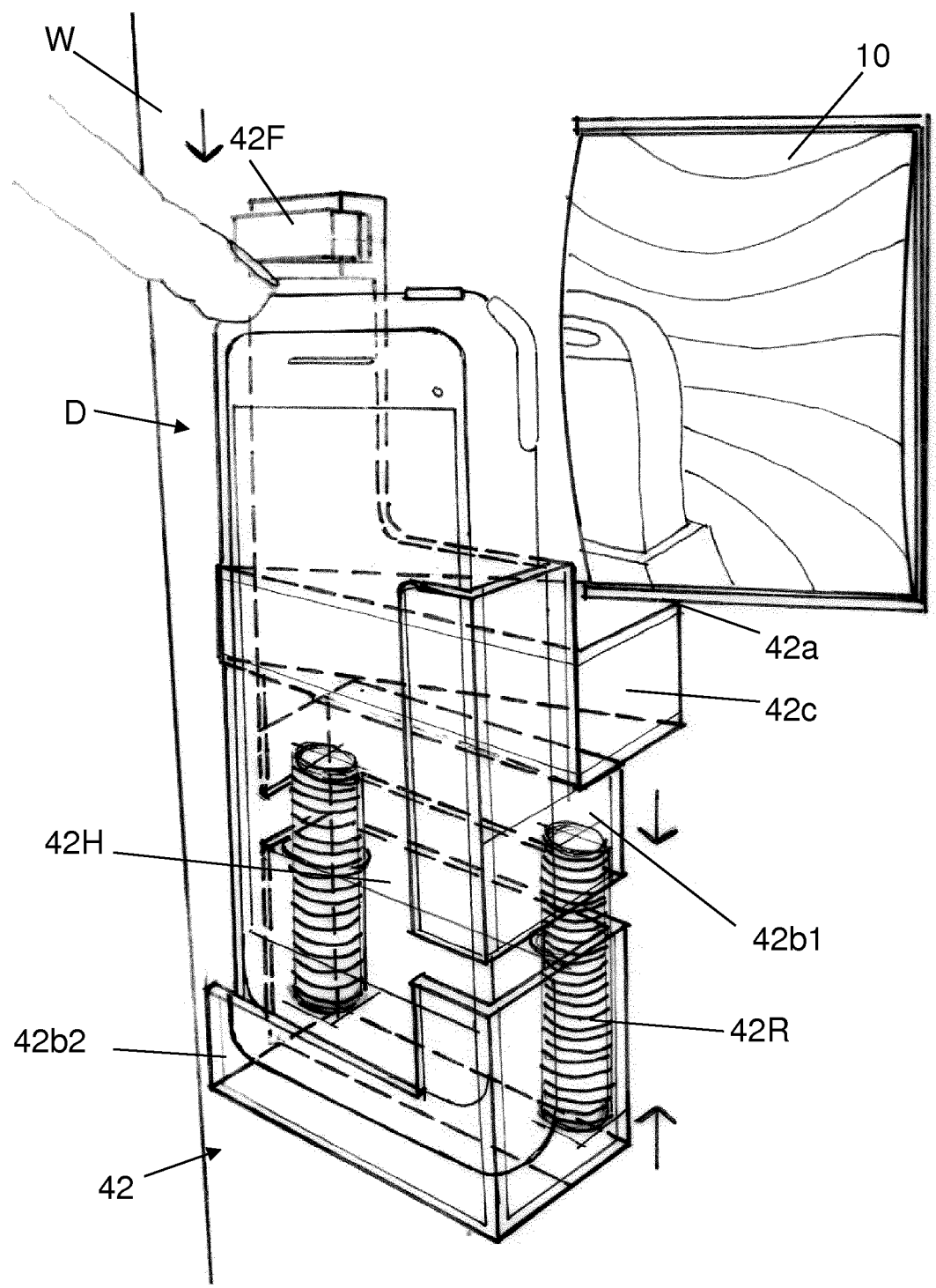
FIGS. 17a and 17b show, by means of respective perspective views, another embodiment, for two different operative positions, of the support and convex mirror of the system of the fitting room of the first aspect of the invention.
Figure 17B:
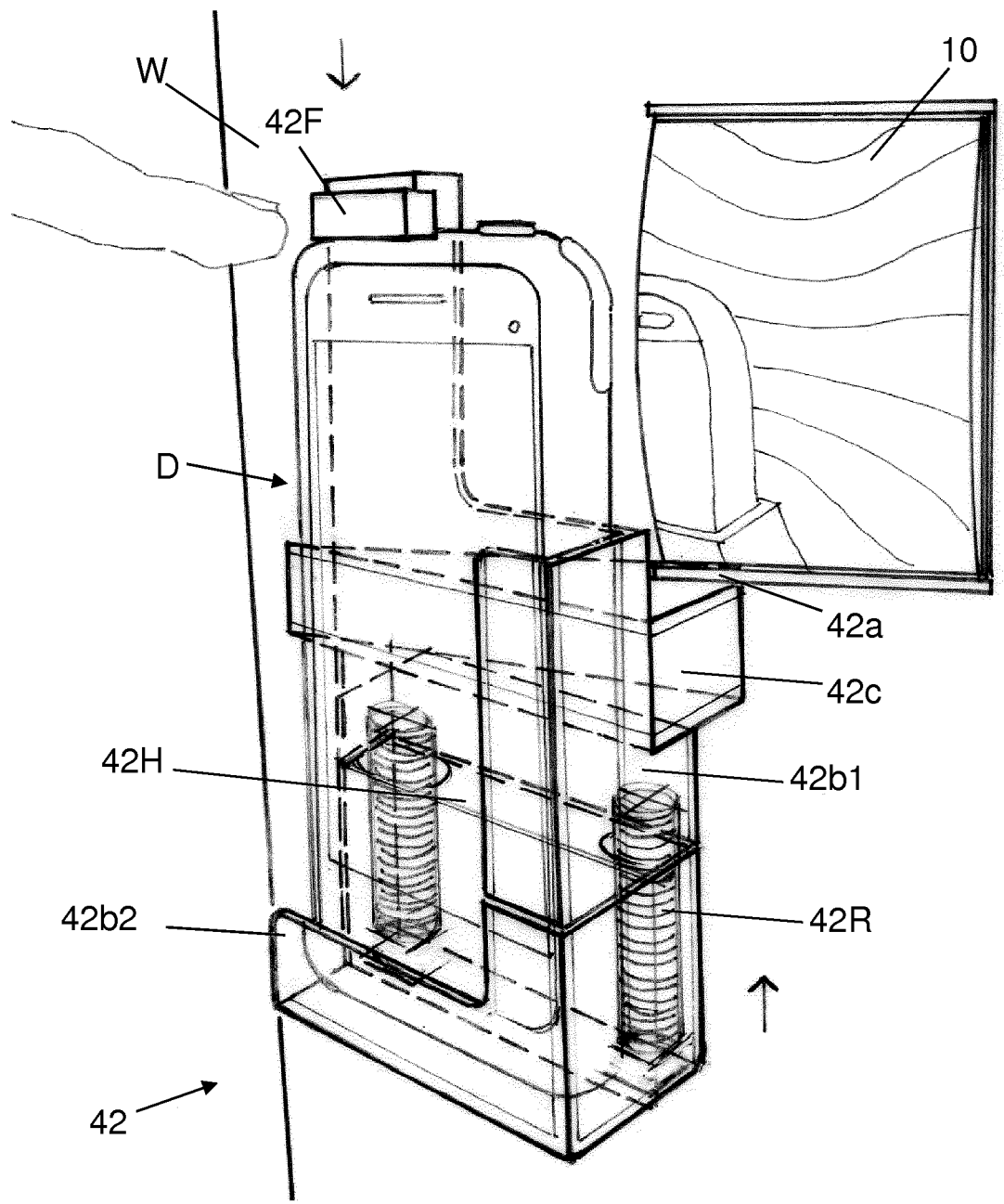

FIGS. 17a and 17b show another embodiment, for which the support 42 includes two parts 42b1 and 42b1, articulated to each other to move according to linear approaching/distancing movements, and coupled to each other by means of springs 42R housed inside back compartment 42H of lower part 42b2.

Parts 42b1 and 42b2 adopt together, at a front side thereof (according to the position illustrated) a half-pocket-type coupling arrangement into which the smartphone D is side introduced, and held.

A convex mirror 10 is also attached to a back portion 42a of the upper part 42b1, the latter including an intermediate portion 42c which separates the portion of the half-pocket-type coupling arrangement of upper part 42b1 and the back portion 42a such that the latter is distanced and oriented appropriately to allow the acquiring of portrait photographic images of a user placed in front of, for example, a wall or mirror onto which the support 42 is attached.

Upper part 42b1 also comprises a retaining finger with a lip portion 42F for retaining the smartphone D by its top edge housed in the half-pocket-type coupling arrangement.

The support 42 of the embodiment shown in FIGS. 17a and 17b also includes a mechanism for adapting the support 42 to alternately house smartphones having different sizes. In this case, said mechanism is implemented by the springs 42R and the specific configuration of upper 42b1 and lower 42b2 parts which allow them to get closer or away from each other by means of the above mentioned linear displacement, such that for a longer smartphone D said parts 42b1, 42b2 will be more distanced with respect to each other, and for a shorter smartphone D they will be closer to each other (such as for the example depicted in FIG. 17b). The lip portion 42F also moves with upper part 42b1, so it will retain the smartphone D by its top edge whatever its length is.

Regarding the width of the smartphones D, as the half-pocket-type arrangement defined by parts 42b1, 42b2 is side opened, it can house smartphones with any width.

Non illustrated embodiments differ from the ones illustrated in FIGS. 5, 12 to 17b in that they include a flat mirror instead of convex mirror 10.

Figure 8:
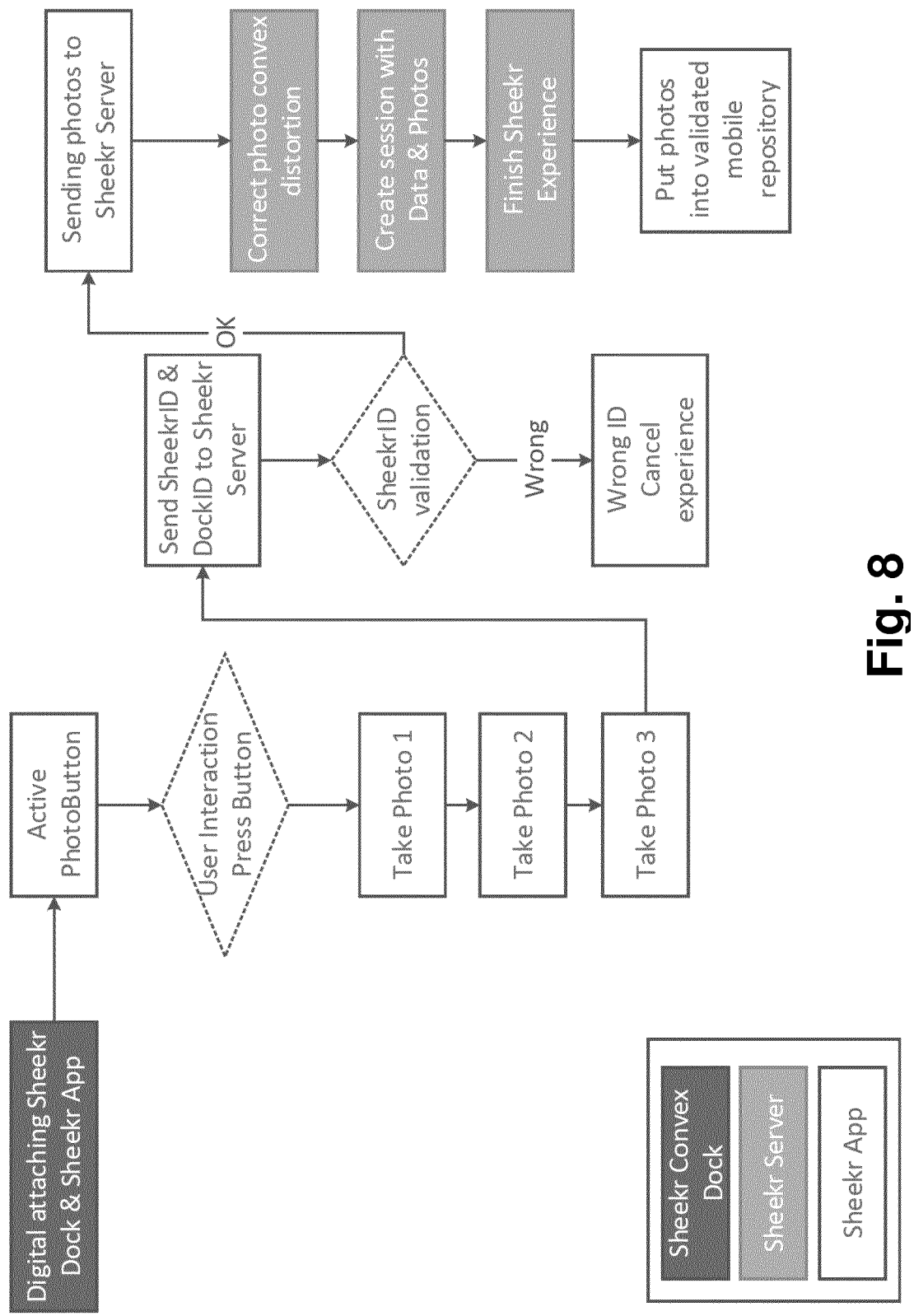
FIG. 8 is a flowchart showing a possible operation process of the system of the present invention for the embodiment shown in FIG. 4, but without the inclusion and/or operation of the elements identified by the numerals 5 and 6 in said Figure.
Figure 9:
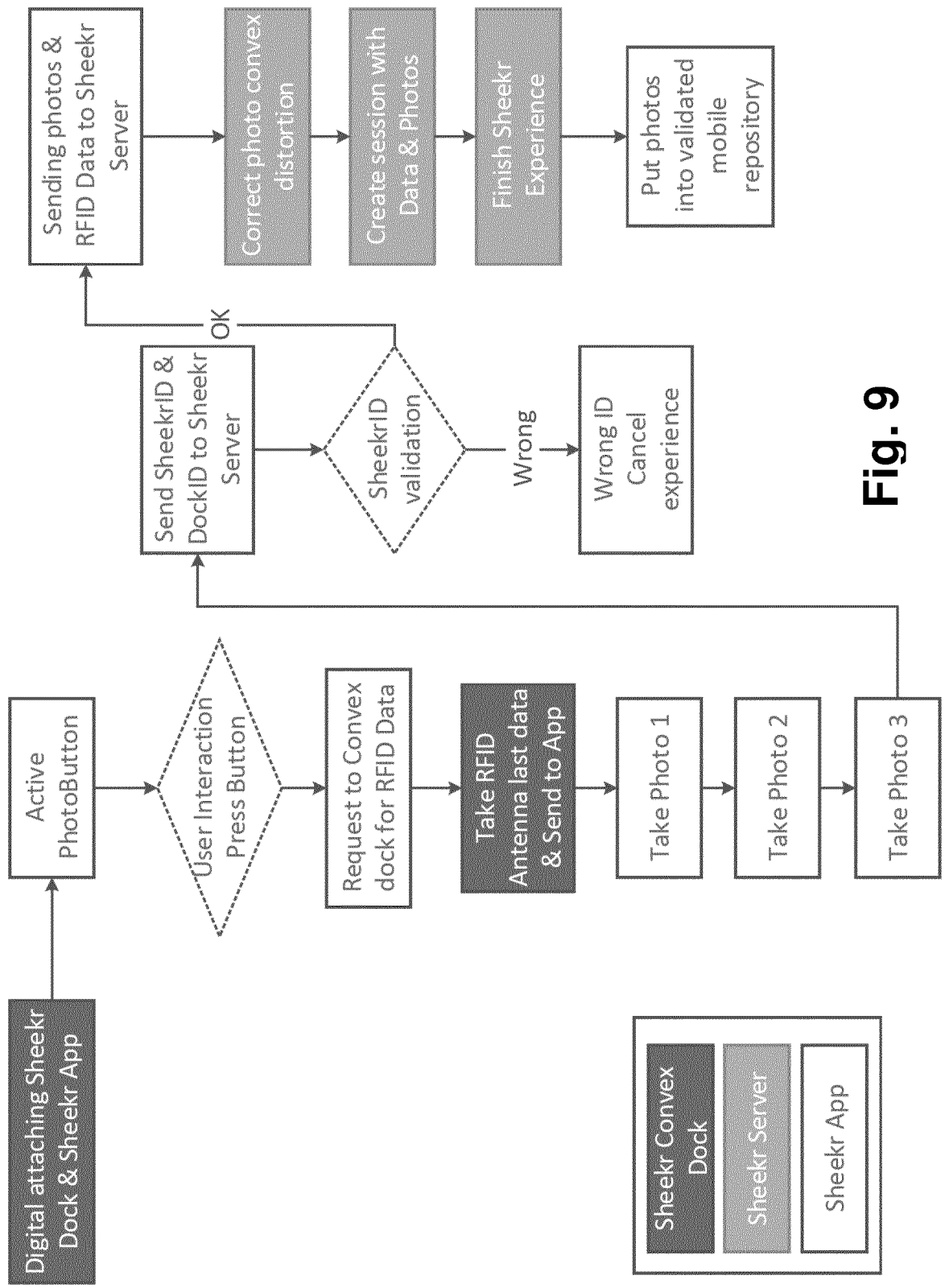
FIG. 9 is a flowchart similar to the one of FIG. 8, also applied to the embodiment of FIG. 4, but including the operation of said 5 and 6 elements, i.e. actions associated to an RFID reading process.

Flowcharts showing possible operation processes of the system of FIG. 4 are shown in FIGS. 8 and 9, using the same terminology and grey codes as in the flowcharts of FIGS. 6 and 7.

According to the flowchart of FIG. 8, first, the above described "digital attaching" between the "Sheekr Dock" and the "Sheekr App" is performed. In contrast to the flowcharts of FIGS. 6 and 7, an attaching validation is not needed for the flowchart of FIG. 8.

Once the digital attaching has been achieved, a virtual "PhotoButton" is activated by the "Sheekr App", i.e. appears on the screen Ds. By pressing said "PhotoButton", the user starts a timer countdown to trigger the camera to take one or more distorted photos, generally one distorted photo per pose.

The "Sheekr App" controls the smartphone D to send the "Sheekr ID" and the "Dock ID" to the "Sheekr Server", which is in charge of performing a validation of the "Sheekr ID" (for the Dock associated to the received "Dock ID"). If the "Sheekr ID" is not validated (wrong ID or unauthorised user), then the "experience" is cancelled.

If the "Sheekr ID" is valid, then the "Sheekr App" controls the smartphone D to send the distorted photos to the "Sheekr Server", the latter performing a correction of the convex distortion thereof to obtain corresponding panoramic images.

Once, all the photos are corrected, the "Sheekr Server" to the "Sheekr Server" optionally creates a user session with associated data (such as metadata) to the created images.

Then, the "experience" is finished, and the panoramic image(s) can be downloaded to the portable device D and/or put into validated mobile repository (as indicated in the Figure) and/or be made accessible to other users, such as users of a social network or community, in order to allow them to rank and/or express their opinion about it.

The order of some of the steps of the flowchart of FIG. 8 could be different to the illustrated one. For example, the taking of photos could be performed after the "Sheekr ID" validation.

Similarly to FIG. 7, FIG. 9 shows a flowchart very similar to the one of FIG. 8 but including also the use of above mentioned RFID tag reader 5, 6.

The flowchart of FIG. 9 includes the same steps as the flowchart of FIG. 8, with the addition of a requesting, by means of the "Sheekr App" to the here called "Sheekr Convex Dock" (i.e. local computing entity SL) for RFID data, the latter, in response to said request, taking the RFID antenna last data and sending said data to the "Sheekr App". In this case, the "Sheekr App" also sends, together with the distorted photos, the RFID data to the "Sheekr Server", the latter preferably associating the received RFID data to the panoramic image(s), such that the pieces of clothing there depicted are duly identified, and features associated thereto (price, size, model, colour, etc.) can thus be made virtually accessible to the user and/or to the users of a social network or community.

A person skilled in the art could introduce changes and modifications in the embodiments described without departing from the scope of the invention as it is defined in the attached claims.

The invention claimed is:

1. A fitting room, comprising:
   a mirror; and
   an attaching mechanism for attaching, with respect to said mirror, a computing device having at least one built-in camera, such that the at least one built-in camera is positioned aiming towards a reflective surface of said mirror to acquire images reflected on said reflective surface of a user placed in front of said mirror;

wherein said computing device is a portable computing device, and wherein said portable computing device is a portable computing device of a plurality of portable computing devices, having built-in cameras, of a plurality of users;

wherein said attaching mechanism comprises a support physically attached to said mirror, or to a structural member fixed thereto, said support being configured and arranged to interchangeably and removably attach thereto any of said plurality of portable computing devices having built-in cameras; and wherein the fitting room further comprises a system which comprises a local computing entity adapted to establish a communication link with the portable computing device attached or to be attached to said support, in order to acquire one or more images reflected on said reflective surface of the user placed in front of said mirror with the at least one built-in camera of the portable computing device once attached to the support;

wherein said communication link is a wired or wireless communication bidirectional link, and wherein said local computing entity and said portable computing device are adapted to automatically establish said wired or wireless communication bidirectional link with each other:

once the portable computing device is attached to said support; or once the portable computing device is located within a determined area proximate to the local computing entity, to perform an univocal association between the local computing entity and the portable computing device, for at least identification purposes;

wherein said local computing entity is adapted to receive, through said communication bidirectional link, at least a user ID associated to the portable computing device, univocally associated therewith, or to an application program running in the portable computing device, and to identify and validate said user ID;

wherein said support is stationary, the system including an optical element attached to the support such that it remains at a predetermined distance and orientation with respect to the at least one built-in camera of the portable computing device attached to the support, to allow, with a single shot, acquiring at least one distorted image of the user including different portions along her/his height; and wherein said mirror is a main mirror and said optical element is a convex mirror with its convex side facing the user placed in front of said main mirror and also facing the at least one built-in camera, which includes a rear built-in camera, the portable computing device comprising a front display touch screen displaying graphic elements provided by said application program when running in the portable computing device, including a virtual button to be pressed by the user in order to start a timer countdown to trigger said acquiring of at least one distorted image, and also displaying a distorted reflection image of the user on the convex mirror or a preview undistorted image of the user generated by a pre-correction of the at least one distorted image performed by the application program.

2. The fitting room according to claim 1, wherein said system is a portrait photographic system which comprises said portable computing device removably attached to said support, and said local computing entity.

3. The fitting room according to claim 1, wherein said system further comprises a remote computing entity adapted to establish a bidirectional communication with the portable computing device and/or with the local computing entity, to receive at least a user ID associated to the portable computing device, univocally associated with the local computing entity, or to an application program running in the portable computing device, and to identify and validate said user ID.

4. The fitting room according to claim 1, wherein said local computing entity is adapted to control, by itself or under control of a remote computing entity, the at least one built-in camera of the portable computing device to acquire said one or more images of the user placed in front of the mirror.

5. The fitting room according to claim 1, wherein said support comprises a coupling arrangement for firmly coupling and holding the portable computing device in a proper position for acquiring images of the user.

6. The fitting room according to claim 4, wherein said system is a portrait photographic system which comprises said portable computing device removably attached to said support, and said local computing entity, and wherein the portable computing device is adapted, once the user ID has been validated:

to send sequence of images or at least one distorted image to the local computing entity or to the remote computing entity, and wherein the local computing entity or the remote computing entity is adapted to process the received sequence of images or the received at least one distorted image to obtain a single panoramic image of the user from, respectively, a composition of the sequence of images or a distortion correction of the at least one distorted image; or to process, by itself, an acquired sequence of images or an acquired at least one distorted image to obtain a single panoramic image of the user from, respectively, a composition of the sequence of images or a distortion correction of the at least one distorted image.

7. The fitting room according to claim 1, wherein said system comprises a remote computing entity adapted to establish a bidirectional communication with the portable computing device and/or with the local computing entity, and wherein said system further comprises at least one tag code reader for reading ID tags attached to pieces of clothing worn by the user, wherein the local computing entity and/or the remote computing entity are connected to the output of said at least one tag code reader, or implement a portion thereof, to obtain ID data identifying the pieces of clothing worn by the user placed in front of the mirror, in order to associate said ID data to one or more images of the user acquired or to be acquired.

8. The fitting room according to claim 1, wherein the support is configured and arranged to interchangeably and removably attach thereto any of a plurality of portable computing devices having different dimensions.

9. A fitting room, comprising:

a mirror; and an attaching mechanism for attaching, with respect to said mirror, a computing device having at least one built-in camera, such that the at least one built-in camera is positioned aiming towards a reflective surface of said mirror to acquire images reflected on said reflective surface of a user placed in front of said mirror;

wherein said computing device is a portable computing device, and wherein said portable computing device is a portable computing device of a plurality of portable computing devices, having built-in cameras, of a plurality of users;

wherein said attaching mechanism comprises a support physically attached to said mirror, or to a structural member fixed thereto, said support being configured and arranged to interchangeably and removably attach thereto any of said plurality of portable computing devices having built-in cameras; and wherein the fitting room further comprises a system which comprises a local computing entity adapted to establish a communication link with the portable computing device attached or to be attached to said support, in order to acquire one or more images reflected on said reflective surface of the user placed in front of said mirror with the at least one built-in camera of the portable computing device once attached to the support;

wherein said communication link is a wired or wireless communication bidirectional link, and wherein said local computing entity and said portable computing device are adapted to automatically establish said wired or wireless communication bidirectional link with each other:

once the portable computing device is attached to said support; or once the portable computing device is located within a determined area proximate to the local computing entity, to perform an univocal association between the local computing entity and the portable computing device, for at least identification purposes;

wherein said local computing entity is adapted to receive, through said communication bidirectional link, at least a user ID associated to the portable computing device, univocally associated therewith, or to an application program running in the portable computing device, and to identify and validate said user ID;

wherein said support is stationary, the system including an optical element attached to the support such that it remains at a predetermined distance and orientation with respect to the at least one built-in camera of the portable computing device attached to the support, to allow, with a single shot, acquiring at least one distorted image of the user including different portions along her/his height; and wherein said support comprises a coupling arrangement for firmly coupling and holding the portable computing device in a proper position for acquiring images of the user, and wherein said optical element is movable with respect to said support, the system comprising a driving mechanism including an electric motor and a cinematic chain mechanically connected to the movable optical element, and a position sensor for detecting the position of the rear built-in camera of the portable computing device attached to the support, wherein the local computing entity is connected to an output of said position sensor and to an input of said electric motor to control the latter to move the optical element based on the detected position, in order to adapt the system to portable computing devices differing at least in that their rear built-in cameras are placed in different positions.

10. A fitting room, comprising:
a mirror; and
an attaching mechanism for attaching, with respect to said mirror, a computing device having at least one built-in camera, such that the at least one built-in camera is positioned aiming towards a reflective surface of said mirror to acquire images reflected on said reflective surface of a user placed in front of said mirror;

wherein said computing device is a portable computing device, and wherein said portable computing device is a portable computing device of a plurality of portable computing devices, having built-in cameras, of a plurality of users;

wherein said attaching mechanism comprises a support physically attached to said mirror, or to a structural member fixed thereto, said support being configured and arranged to interchangeably and removably attach thereto any of said plurality of portable computing devices having built-in cameras; and wherein the fitting room further comprises a system which comprises a local computing entity adapted to establish a communication link with the portable computing device attached or to be attached to said support, in order to acquire one or more images reflected on said reflective surface of the user placed in front of said mirror with the at least one built-in camera of the portable computing device once attached to the support;

wherein said communication link is a wired or wireless communication bidirectional link, and wherein said local computing entity and said portable computing device are adapted to automatically establish said wired or wireless communication bidirectional link with each other:

once the portable computing device is attached to said support; or once the portable computing device is located within a determined area proximate to the local computing entity, to perform an univocal association between the local computing entity and the portable computing device, for at least identification purposes;

wherein said local computing entity is adapted to receive, through said communication bidirectional link, at least a user ID associated to the portable computing device, univocally associated therewith, or to an application program running in the portable computing device, and to identify and validate said user ID; and wherein said local computing entity and said portable computing device are adapted to automatically establish said wired or wireless communication bidirectional link with each other only if a signal indicative of the portable computing device being shaken is received by the local computing entity, the portable computing device including a sensor unit to detect its shaking and, in response to said detection, generate and send said signal to the local computing entity, and the local computing entity being adapted to receive and process said signal to automatically establish said wired or wireless communication bidirectional link.

11. The fitting room according to claim 10, wherein said support is movable among a plurality of positions about at least one horizontal axis under the control of the local computing entity, by itself or under control of said remote computing entity, once said user ID has been validated, synchronously with said acquiring of one or more images such that at least one image is acquired for each of said plurality of positions, so that a sequence of images covering different portions of the user along her/his height are acquired.

12. The fitting room according to claim 10, wherein said support is stationary and attached to said mirror, such that the mirror remains at a predetermined distance and orientation with respect to the at least one built-in camera of the portable computing device attached to the support, to allow, with a single shot, acquiring at least one image of the user including different portions along her/his height.

13. The fitting room according to claim 10, wherein said support is stationary and attached to said structural member or to said mirror, the system including a separate optical element also attached to said structural member or mirror such that it remains at a predetermined distance and orientation with respect to the at least one built-in camera of the portable computing device attached to the support, to allow, with a single shot, acquiring at least one distorted image of the user including different portions along her/his height.

14. The fitting room according to claim 10, wherein said system is a portrait photographic system which comprises said portable computing device removably attached to said support, and said local computing entity.

15. The fitting room according to claim 10, wherein said system further comprises a remote computing entity adapted to establish a bidirectional communication with the portable computing device and/or with the local computing entity, to receive at least a user ID associated to the portable computing device, univocally associated with the local computing entity, or to an application program running in the portable computing device, and to identify and validate said user ID.

16. The fitting room according to claim 10, wherein said local computing entity is adapted to control, by itself or under control of a remote computing entity, the at least one built-in camera of the portable computing device to acquire said one or more images of the user placed in front of the mirror.

17. The fitting room according to claim 16, wherein said system is a portrait photographic system which comprises said portable computing device removably attached to said support, and said local computing entity, and wherein the portable computing device is adapted, once the user ID has been validated:
 to send sequence of images or at least one distorted image to the local computing entity or to the remote computing entity, and wherein the local computing entity or the remote computing entity is adapted to process the received sequence of images or the received at least one distorted image to obtain a single panoramic image of the user from, respectively, a composition of the sequence of images or a distortion correction of the at least one distorted image; or
 to process, by itself, an acquired sequence of images or an acquired at least one distorted image to obtain a single panoramic image of the user from, respectively, a composition of the sequence of images or a distortion correction of the at least one distorted image.

18. The fitting room according to claim 10, wherein said support comprises a coupling arrangement for firmly coupling and holding the portable computing device in a proper position for acquiring images of the user.

19. The fitting room according to claim 10, wherein said system comprises a remote computing entity adapted to establish a bidirectional communication with the portable computing device and/or with the local computing entity, and wherein said system further comprises at least one tag code reader for reading ID tags attached to pieces of clothing worn by the user, wherein the local computing entity and/or the remote computing entity are connected to the output of said at least one tag code reader, or implement a portion thereof, to obtain ID data identifying the pieces of clothing worn by the user placed in front of the mirror, in order to associate said ID data to one or more images of the user acquired or to be acquired.

20. A fitting room, comprising:
 a mirror; and
 an attaching mechanism for attaching, with respect to said mirror, a computing device having at least one built-in camera, such that the at least one built-in camera is positioned aiming towards a reflective surface of said mirror to acquire images reflected on said reflective surface of a user placed in front of said mirror;
 wherein said computing device is a portable computing device, and wherein said portable computing device is a portable computing device of a plurality of portable computing devices, having built-in cameras, of a plurality of users;
 wherein said attaching mechanism comprises a support physically attached to said mirror, or to a structural member fixed thereto, said support being configured and arranged to interchangeably and removably attach thereto any of said plurality of portable computing devices having built-in cameras; and
 wherein the fitting room further comprises a system which comprises a local computing entity adapted to establish a communication link with the portable computing device attached or to be attached to said support, in order to acquire one or more images reflected on said reflective surface of the user placed in front of said mirror with the at least one built-in camera of the portable computing device once attached to the support;
 wherein said communication link is a wired or wireless communication bidirectional link, and wherein said local computing entity and said portable computing device are adapted to automatically establish said wired or wireless communication bidirectional link with each other:
 once the portable computing device is attached to said support; or
 once the portable computing device is located within a determined area proximate to the local computing entity, to perform an univocal association between the local computing entity and the portable computing device, for at least identification purposes;
 wherein said local computing entity is adapted to receive, through said communication bidirectional link, at least a user ID associated to the portable computing device, univocally associated therewith, or to an application program running in the portable computing device, and to identify and validate said user ID;
 wherein said support is stationary and attached to said structural member or to said mirror, the system including a separate optical element also attached to said structural member or mirror such that it remains at a predetermined distance and orientation with respect to the at least one built-in camera of the portable computing device attached to the support, to allow, with a single shot, acquiring at least one distorted image of the user including different portions along her/his height; and
 wherein the support and the optical element are attached to said structural member, wherein said optical element is said mirror which is a convex mirror with its convex side facing the user placed in front of the mirror and also facing the at least one built-in camera, which is aimed towards said convex mirror, the portable computing device comprising a front display touch screen displaying graphic elements provided by said application program when running in the portable computing device, including a virtual button to be pressed by the user in order to start a timer countdown to trigger said acquiring of at least one distorted image, and also displaying a distorted reflection image of the user on the convex mirror or a preview undistorted image of the user generated by a pre-correction of the at least one distorted image performed by the application program.

21. A fitting room, comprising:

a mirror; and an attaching mechanism for attaching, with respect to said mirror, a computing device having at least one built-in camera, such that the at least one built-in camera is positioned aiming towards a reflective surface of said mirror to acquire images reflected on said reflective surface of a user placed in front of said mirror;

wherein said computing device is a portable computing device, and wherein said portable computing device is a portable computing device of a plurality of portable computing devices, having built-in cameras, of a plurality of users;

wherein said attaching mechanism comprises a support physically attached to said mirror, or to a structural member fixed thereto, said support being configured and arranged to interchangeably and removably attach thereto any of said plurality of portable computing devices having built-in cameras; and wherein the fitting room further comprises a system which comprises a local computing entity adapted to establish a communication link with the portable computing device attached or to be attached to said support, in order to acquire one or more images reflected on said reflective surface of the user placed in front of said mirror with the at least one built-in camera of the portable computing device once attached to the support;

wherein said communication link is a wired or wireless communication bidirectional link, and wherein said local computing entity and said portable computing device are adapted to automatically establish said wired or wireless communication bidirectional link with each other:

once the portable computing device is attached to said support; or once the portable computing device is located within a determined area proximate to the local computing entity, to perform an univocal association between the local computing entity and the portable computing device, for at least identification purposes;

wherein said local computing entity is adapted to receive, through said communication bidirectional link, at least a user ID associated to the portable computing device, univocally associated therewith, or to an application program running in the portable computing device, and to identify and validate said user ID;

wherein said support is stationary and attached to said structural member or to said mirror, the system including a separate optical element also attached to said structural member or mirror such that it remains at a predetermined distance and orientation with respect to the at least one built-in camera of the portable computing device attached to the support, to allow, with a single shot, acquiring at least one distorted image of the user including different portions along her/his height; and wherein said mirror is a main mirror to which the support and the optical element are attached, wherein said optical element is a convex mirror with its convex side facing the user placed in front of the mirror, and also facing the at least one built-in camera, which is aimed towards said convex mirror, the portable computing device comprising a front display touch screen displaying graphic elements provided by said application program when running in the portable computing device, including a virtual button to be pressed by the user in order to start a timer countdown to trigger said acquiring of at least one distorted image, and also displaying a distorted reflection image of the user on the convex mirror or a preview undistorted image of the user generated by a pre-correction of the at least one distorted image performed by the application program.

* * * * *